(12) United States Patent
Cohen et al.

(10) Patent No.: US 8,929,208 B2
(45) Date of Patent: *Jan. 6, 2015

(54) CONDITIONALLY RELEASING A COMMUNIQUÉ DETERMINED TO BE AFFILIATED WITH A PARTICULAR SOURCE ENTITY IN RESPONSE TO DETECTING OCCURRENCE OF ONE OR MORE ENVIRONMENTAL ASPECTS

(75) Inventors: Alexander J. Cohen, Mill Valley, CA (US); Edward K. Y. Jung, Bellevue, WA (US); Royce A. Levien, Lexington, MA (US); Robert W. Lord, Seattle, WA (US); Mark A. Malamud, Seattle, WA (US); William H. Mangione-Smith, Kirkland, WA (US); John D. Rinaldo, Jr., Bellevue, WA (US); Clarence T. Tegreene, Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 262 days.

This patent is subject to a terminal disclaimer.

(21) Appl. No.: 12/925,014

(22) Filed: Oct. 12, 2010

(65) Prior Publication Data

US 2011/0173440 A1    Jul. 14, 2011

Related U.S. Application Data

(63) Continuation-in-part of application No. 12/228,664, filed on Aug. 14, 2008, and a continuation-in-part of application No. 12/228,873, filed on Aug. 15, 2008, and a continuation-in-part of application No. 12/287,268, filed on Oct. 7, 2008, now Pat. No. 8,224,907, and a continuation-in-part of application No. 12/454,113, filed on May 12, 2009, and a continuation-in-part of application No. 12/799,794, filed on Apr. 29, 2010, and a continuation-in-part of application No. 12/802,139, filed on May 27, 2010, now Pat. No. 8,626,848, and a continuation-in-part of application No. 12/802,136, filed on May 28, 2010, now Pat. No. 8,850,044, and a continuation-in-part of application No. 12/802,863, filed on Jun. 14, 2010, and a continuation-in-part of application No. 12/802,922, filed on Jun. 15, 2010, and a continuation-in-part of application No. 12/804,765, filed on Jul. 27, 2010, and a continuation-in-part of application No. 12/804,832, filed on Jul. 28, 2010, and a continuation-in-part of application No. 12/806,677, filed on Aug. 17, 2010, and a continuation-in-part of application No. 12/806,738, filed on Aug. 18, 2010, and a continuation-in-part of application No. 12/807,700, filed on Sep. 9, 2010, and a continuation-in-part of application No. 12/807,701, filed on Sep. 10, 2010, now Pat. No. 8,730,836, and a continuation of application No. 12/924,992, filed on Oct. 8, 2010.

(51) Int. Cl.
| | |
|---|---|
| *H04J 1/16* | (2006.01) |
| *H04B 7/212* | (2006.01) |
| *H04W 4/00* | (2009.01) |
| *H04H 20/67* | (2008.01) |
| *H04L 12/58* | (2006.01) |
| *H04L 29/08* | (2006.01) |
| *H04L 29/06* | (2006.01) |

(52) U.S. Cl.
CPC ............. *H04L 12/585* (2013.01); *H04L 67/18* (2013.01); *H04L 69/24* (2013.01); *H04L 51/12* (2013.01); *H04L 63/0227* (2013.01); *H04L 12/588* (2013.01); *H04L 12/5865* (2013.01)
USPC ........... 370/229; 370/230; 370/228; 370/337; 370/338; 370/339

(58) Field of Classification Search
CPC ..................................................... H04L 47/30

| USPC .......... 370/338, 337, 339, 328, 329, 330
See application file for complete search history.

(56) References Cited

U.S. PATENT DOCUMENTS 3,985,972 A 10/1976 Rolin et al.
4,218,738 A 8/1980 Matyas et al.
(Continued)

OTHER PUBLICATIONS

"Sometimes, I just don't want them to know it's me calling . . . "; spoofcard.com; pp. 1-2; located at: http://www.spoofcard.com/; printed on Jul. 8, 2010.

(Continued)

*Primary Examiner* — Noel Beharry
*Assistant Examiner* — Abdelnabi Musa

(57) ABSTRACT

A computationally implemented method includes, but is not limited to: intercepting a communiqué that is determined to be affiliated with a source entity and that is addressed to an end user to prevent, at least temporarily, the communiqué from being received by a communication device associated with the end user; and releasing the communiqué to the communication device in response to at least detecting occurrence of one or more environmental aspects associated with the communication device, the releasing of the communiqué being in accordance with one or more conditional directives of the end user to conditionally obfuscate the communiqué determined to be affiliated with the source entity. In addition to the foregoing, other method aspects are described in the claims, drawings, and text forming a part of the present disclosure.

45 Claims, 18 Drawing Sheets

(56) References Cited

U.S. PATENT DOCUMENTS

| | | | |
|---|---|---|---|
| 5,493,692 A * | 2/1996 | Theimer et al. | 455/26.1 |
| 5,508,699 A | 4/1996 | Silverman | |
| 5,732,138 A | 3/1998 | Noll et al. | |
| 5,751,806 A | 5/1998 | Ryan | |
| 5,790,074 A | 8/1998 | Rangedahl et al. | |
| 5,812,639 A | 9/1998 | Bartholomew et al. | |
| 5,835,856 A | 11/1998 | Patel | |
| 5,933,498 A | 8/1999 | Schneck et al. | |
| 6,005,926 A | 12/1999 | Mashinsky | |
| 6,026,291 A | 2/2000 | Carlsson et al. | |
| 6,199,102 B1 | 3/2001 | Cobb | |
| 6,224,109 B1 | 5/2001 | Yang | |
| 6,351,745 B1 | 2/2002 | Itakura et al. | |
| 6,396,531 B1 | 5/2002 | Gerszberg et al. | |
| 6,496,931 B1 | 12/2002 | Rajchel et al. | |
| 6,510,236 B1 | 1/2003 | Crane et al. | |
| 6,522,889 B1 | 2/2003 | Aarnio | |
| 6,529,592 B1 | 3/2003 | Khan | |
| 6,563,913 B1 | 5/2003 | Kaghazian | |
| 6,591,291 B1 | 7/2003 | Gabber et al. | |
| 6,738,808 B1 | 5/2004 | Zellner et al. | |
| 6,816,885 B1 | 11/2004 | Raghunandan | |
| 6,857,021 B1 | 2/2005 | Schuster et al. | |
| 6,918,039 B1 | 7/2005 | Hind et al. | |
| 6,937,730 B1 | 8/2005 | Buxton | |
| 6,985,569 B2 | 1/2006 | Baker | |
| 6,990,590 B2 | 1/2006 | Hanson et al. | |
| 7,007,025 B1 | 2/2006 | Nason et al. | |
| 7,133,837 B1 | 11/2006 | Barnes, Jr. | |
| 7,159,011 B1 | 1/2007 | Knight et al. | |
| 7,203,315 B1 | 4/2007 | Livesay | |
| 7,225,342 B2 | 5/2007 | Takao et al. | |
| 7,248,885 B2 | 7/2007 | Benco et al. | |
| 7,275,090 B2 | 9/2007 | Oeda et al. | |
| 7,308,251 B2 | 12/2007 | Karaoguz | |
| 7,310,816 B1 | 12/2007 | Burns et al. | |
| 7,327,312 B1 | 2/2008 | Harris | |
| 7,334,267 B2 | 2/2008 | Engstrom | |
| 7,363,024 B2 | 4/2008 | Jenkins | |
| 7,382,881 B2 | 6/2008 | Uusitalo et al. | |
| 7,389,541 B2 | 6/2008 | Jia et al. | |
| 7,400,878 B2 | 7/2008 | Hassan et al. | |
| 7,401,159 B1 * | 7/2008 | Aviani et al. | 709/238 |
| 7,458,095 B2 | 11/2008 | Forsberg | |
| 7,567,936 B1 | 7/2009 | Peckover et al. | |
| 7,587,480 B2 | 9/2009 | Gebhart et al. | |
| 7,614,081 B2 | 11/2009 | Prohel et al. | |
| 7,616,943 B2 | 11/2009 | Oesterling | |
| 7,623,639 B2 | 11/2009 | Thai et al. | |
| 7,627,334 B2 | 12/2009 | Cohen et al. | |
| 7,630,495 B2 | 12/2009 | Kiiveri et al. | |
| 7,634,295 B2 | 12/2009 | Hayaashi et al. | |
| 7,643,484 B2 | 1/2010 | Willman et al. | |
| 7,724,918 B2 | 5/2010 | Balakrishnan et al. | |
| 7,783,741 B2 | 8/2010 | Hardt | |
| 7,787,870 B2 | 8/2010 | Burgan et al. | |
| 7,797,024 B2 | 9/2010 | Sutardja | |
| 7,814,017 B2 | 10/2010 | Vancini et al. | |
| 7,920,050 B2 | 4/2011 | Juels et al. | |
| 7,921,052 B2 | 4/2011 | Dabney et al. | |
| 7,966,664 B2 | 6/2011 | Makkinejad | |
| 8,140,062 B1 | 3/2012 | Hildner et al. | |
| 8,190,128 B1 * | 5/2012 | Lundy et al. | 455/411 |
| 2001/0023432 A1 | 9/2001 | Council et al. | |
| 2001/0031631 A1 | 10/2001 | Pitts | |
| 2001/0034677 A1 | 10/2001 | Farhat et al. | |
| 2001/0034723 A1 | 10/2001 | Subramaniam | |
| 2001/0036822 A1 | 11/2001 | Mead et al. | |
| 2002/0044067 A1 | 4/2002 | Ilcisin | |
| 2002/0077078 A1 | 6/2002 | Antti | |
| 2002/0081972 A1 | 6/2002 | Rankin | |
| 2002/0099822 A1 * | 7/2002 | Rubin et al. | 709/225 |
| 2002/0111954 A1 | 8/2002 | McCoy | |
| 2002/0143869 A1 | 10/2002 | Cohen | |
| 2002/0154055 A1 | 10/2002 | Davis et al. | |
| 2002/0163572 A1 | 11/2002 | Center, Jr. et al. | |
| 2002/0169664 A1 | 11/2002 | Walker et al. | |
| 2002/0169840 A1 | 11/2002 | Sheldon et al. | |
| 2002/0174073 A1 | 11/2002 | Nordman et al. | |
| 2002/0174363 A1 | 11/2002 | Chefalas et al. | |
| 2002/0177449 A1 | 11/2002 | McDonnell et al. | |
| 2002/0188562 A1 | 12/2002 | Igarashi et al. | |
| 2002/0198777 A1 | 12/2002 | Yuasa | |
| 2003/0008672 A1 | 1/2003 | Fujii | |
| 2003/0009593 A1 * | 1/2003 | Apte | 709/245 |
| 2003/0014286 A1 | 1/2003 | Cappellini | |
| 2003/0014637 A1 | 1/2003 | Ellison et al. | |
| 2003/0021413 A1 | 1/2003 | Kiiveri et al. | |
| 2003/0044050 A1 | 3/2003 | Clark et al. | |
| 2003/0086543 A1 | 5/2003 | Raymond | |
| 2003/0134645 A1 | 7/2003 | Stern et al. | |
| 2003/0145039 A1 | 7/2003 | Bonney et al. | |
| 2003/0149881 A1 | 8/2003 | Patel et al. | |
| 2003/0154254 A1 | 8/2003 | Awasthi | |
| 2003/0158960 A1 | 8/2003 | Engberg | |
| 2003/0177357 A1 | 9/2003 | Chamberlin et al. | |
| 2003/0217151 A1 | 11/2003 | Roese et al. | |
| 2003/0217287 A1 | 11/2003 | Kruglenko | |
| 2003/0220978 A1 | 11/2003 | Rhodes | |
| 2003/0224754 A1 | 12/2003 | Herzog | |
| 2003/0227386 A1 * | 12/2003 | Pulkkinen et al. | 340/573.1 |
| 2003/0233329 A1 | 12/2003 | Laraki et al. | |
| 2004/0015553 A1 | 1/2004 | Griffin et al. | |
| 2004/0030932 A1 | 2/2004 | Juels et al. | |
| 2004/0064692 A1 | 4/2004 | Kahn et al. | |
| 2004/0064734 A1 | 4/2004 | Ehrlich | |
| 2004/0083166 A1 | 4/2004 | Pailles | |
| 2004/0111625 A1 | 6/2004 | Duffy et al. | |
| 2004/0139204 A1 | 7/2004 | Ergezinger et al. | |
| 2004/0162904 A1 | 8/2004 | Eida et al. | |
| 2004/0165702 A1 | 8/2004 | Finnigan | |
| 2004/0178880 A1 | 9/2004 | Meyer et al. | |
| 2004/0181683 A1 | 9/2004 | Jia et al. | |
| 2004/0203776 A1 | 10/2004 | Jun | |
| 2004/0248588 A1 | 12/2004 | Pell et al. | |
| 2004/0254998 A1 | 12/2004 | Horvitz | |
| 2004/0255127 A1 | 12/2004 | Arnouse | |
| 2005/0004871 A1 | 1/2005 | Dort | |
| 2005/0008135 A1 | 1/2005 | Bressler | |
| 2005/0027618 A1 | 2/2005 | Zucker et al. | |
| 2005/0031106 A1 | 2/2005 | Henderson | |
| 2005/0044423 A1 | 2/2005 | Mellmer et al. | |
| 2005/0048951 A1 | 3/2005 | Saito | |
| 2005/0063544 A1 | 3/2005 | Uusitalo et al. | |
| 2005/0075096 A1 | 4/2005 | Aljuraid | |
| 2005/0084100 A1 | 4/2005 | Spies et al. | |
| 2005/0091393 A1 | 4/2005 | Gleeson et al. | |
| 2005/0091543 A1 | 4/2005 | Holtzman et al. | |
| 2005/0100140 A1 | 5/2005 | Tsai | |
| 2005/0114343 A1 | 5/2005 | Wesinger, Jr. et al. | |
| 2005/0136903 A1 | 6/2005 | Kashima et al. | |
| 2005/0172120 A1 | 8/2005 | Wang et al. | |
| 2005/0192056 A1 | 9/2005 | Karaki | |
| 2005/0198131 A1 | 9/2005 | Appelman et al. | |
| 2005/0204008 A1 | 9/2005 | Shinbrood | |
| 2005/0204037 A1 | 9/2005 | Levy | |
| 2005/0227705 A1 | 10/2005 | Rousu et al. | |
| 2005/0232423 A1 | 10/2005 | Horvitz et al. | |
| 2005/0246419 A1 | 11/2005 | Jaatinen | |
| 2005/0275543 A1 | 12/2005 | Hisano | |
| 2006/0005023 A1 | 1/2006 | Homer et al. | |
| 2006/0026438 A1 | 2/2006 | Stern et al. | |
| 2006/0031369 A1 | 2/2006 | Caron et al. | |
| 2006/0041507 A1 | 2/2006 | Novack et al. | |
| 2006/0052095 A1 | 3/2006 | Vazvan | |
| 2006/0075051 A1 | 4/2006 | Jain et al. | |
| 2006/0079238 A1 | 4/2006 | Liu et al. | |
| 2006/0099967 A1 | 5/2006 | Colvin et al. | |
| 2006/0109983 A1 | 5/2006 | Young et al. | |
| 2006/0116142 A1 | 6/2006 | Cofta | |
| 2006/0123245 A1 | 6/2006 | Avidan et al. | |
| 2006/0152374 A1 * | 7/2006 | Singer et al. | 340/573.4 |
| 2006/0167991 A1 | 7/2006 | Heikes et al. | |
| 2006/0168059 A1 | 7/2006 | Chang et al. | |

(56) References Cited

U.S. PATENT DOCUMENTS

| | | |
|---|---|---|
| 2006/0173957 A1 | 8/2006 | Robinson et al. |
| 2006/0176821 A1 | 8/2006 | Hemesath et al. |
| 2006/0227955 A1 | 10/2006 | Thai et al. |
| 2006/0248011 A1 | 11/2006 | Hecht-Nielsen et al. |
| 2006/0256959 A1 | 11/2006 | Hymes |
| 2006/0274896 A1 | 12/2006 | Livesay |
| 2006/0276226 A1 | 12/2006 | Jiang |
| 2007/0022165 A1* | 1/2007 | Daniels et al. ............ 709/206 |
| 2007/0030824 A1* | 2/2007 | Ribaudo et al. ............ 370/328 |
| 2007/0032225 A1 | 2/2007 | Konicek et al. |
| 2007/0036314 A1 | 2/2007 | Kloberdans et al. |
| 2007/0074046 A1 | 3/2007 | Czajkowski et al. |
| 2007/0127658 A1 | 6/2007 | Gruchala et al. |
| 2007/0130323 A1 | 6/2007 | Landsman et al. |
| 2007/0140145 A1* | 6/2007 | Kumar et al. ............ 370/254 |
| 2007/0180122 A1 | 8/2007 | Barrett |
| 2007/0203644 A1 | 8/2007 | Thota et al. |
| 2007/0204026 A1 | 8/2007 | Berger |
| 2007/0208816 A1 | 9/2007 | Baldwin et al. |
| 2007/0208947 A1 | 9/2007 | Sudo et al. |
| 2007/0242827 A1 | 10/2007 | Prafullchandra et al. |
| 2007/0243880 A1 | 10/2007 | Gits et al. |
| 2007/0250571 A1 | 10/2007 | Griffin, Jr. |
| 2007/0250641 A1 | 10/2007 | Flannery et al. |
| 2007/0255704 A1 | 11/2007 | Baek et al. |
| 2007/0264974 A1 | 11/2007 | Frank et al. |
| 2007/0277235 A1 | 11/2007 | Barrett et al. |
| 2007/0293202 A1 | 12/2007 | Moshir et al. |
| 2007/0294096 A1 | 12/2007 | Randall et al. |
| 2008/0005325 A1 | 1/2008 | Wynn et al. |
| 2008/0010665 A1 | 1/2008 | Hinton et al. |
| 2008/0056468 A1 | 3/2008 | Fredlund et al. |
| 2008/0071544 A1 | 3/2008 | Beaufays et al. |
| 2008/0086646 A1 | 4/2008 | Pizano |
| 2008/0108324 A1 | 5/2008 | Moshir et al. |
| 2008/0118150 A1 | 5/2008 | Balakrishnan et al. |
| 2008/0130630 A1 | 6/2008 | Shim et al. |
| 2008/0146157 A1 | 6/2008 | Aaron |
| 2008/0154697 A1 | 6/2008 | Guday et al. |
| 2008/0163365 A1 | 7/2008 | Austin et al. |
| 2008/0169903 A1 | 7/2008 | Fein et al. |
| 2008/0196098 A1 | 8/2008 | Cottrell et al. |
| 2008/0207329 A1 | 8/2008 | Wallace et al. |
| 2008/0235336 A1 | 9/2008 | Stern et al. |
| 2008/0247543 A1 | 10/2008 | Mick et al. |
| 2008/0248815 A1* | 10/2008 | Busch ............ 455/456.5 |
| 2008/0250129 A1 | 10/2008 | Carpenter et al. |
| 2008/0254817 A1 | 10/2008 | Tornkvist |
| 2008/0267099 A1 | 10/2008 | Curcio et al. |
| 2008/0294726 A1 | 11/2008 | Sidman |
| 2008/0300859 A1 | 12/2008 | Chen et al. |
| 2008/0318598 A1 | 12/2008 | Fry |
| 2009/0005072 A1 | 1/2009 | Forstall et al. |
| 2009/0081989 A1 | 3/2009 | Wuhrer |
| 2009/0099701 A1 | 4/2009 | Li et al. |
| 2009/0109037 A1 | 4/2009 | Farmer |
| 2009/0131022 A1 | 5/2009 | Buckley et al. |
| 2009/0132419 A1 | 5/2009 | Grammer et al. |
| 2009/0158054 A1 | 6/2009 | Dijk et al. |
| 2009/0170532 A1 | 7/2009 | Lee et al. |
| 2009/0183215 A1 | 7/2009 | McCartie et al. |
| 2009/0195445 A1 | 8/2009 | DeHaas |
| 2009/0204580 A1* | 8/2009 | Seamon et al. ............ 707/3 |
| 2009/0215469 A1 | 8/2009 | Fisher et al. |
| 2009/0227268 A1 | 9/2009 | Sorensson et al. |
| 2009/0234764 A1 | 9/2009 | Friesen |
| 2009/0248844 A1 | 10/2009 | Sommer et al. |
| 2009/0275363 A1 | 11/2009 | McGregor et al. |
| 2009/0298474 A1 | 12/2009 | George |
| 2009/0318112 A1 | 12/2009 | Vasten |
| 2009/0319172 A1 | 12/2009 | Almeida et al. |
| 2010/0009657 A1 | 1/2010 | Dingler et al. |
| 2010/0015991 A1 | 1/2010 | Evans et al. |
| 2010/0024042 A1 | 1/2010 | Motahari et al. |
| 2010/0053169 A1 | 3/2010 | Cook |
| 2010/0071035 A1 | 3/2010 | Budko et al. |
| 2010/0183125 A1 | 7/2010 | Hayes, Jr. et al. |
| 2010/0257222 A1 | 10/2010 | Hamilton, II et al. |
| 2010/0281051 A1 | 11/2010 | Sheffi et al. |
| 2010/0283728 A1 | 11/2010 | Hollemans et al. |
| 2010/0313253 A1 | 12/2010 | Reiss |
| 2011/0143716 A1 | 6/2011 | Shaw |
| 2011/0238767 A1 | 9/2011 | Murphy |
| 2012/0174233 A1 | 7/2012 | Waterson |

OTHER PUBLICATIONS

"Spoof Caller ID with Telespoof.com"; Telespoof.com; Bearing a date of 2010: pp. 1-2; located at: http://www.telespoof.com/; printed on Jul. 8, 2010.

"Spoofkit is the ultimate windup kit available on the net today"; Spoofkit.com; Bearing dates of 2010-2014; pp. 1-6; located at: http://www.spoofkit.com/; printed on Jul. 8, 2010.

* cited by examiner

CONDITIONALLY RELEASING A COMMUNIQUÉ DETERMINED TO BE AFFILIATED WITH A PARTICULAR SOURCE ENTITY IN RESPONSE TO DETECTING OCCURRENCE OF ONE OR MORE ENVIRONMENTAL ASPECTS

CROSS-REFERENCE TO RELATED APPLICATIONS

The present application is related to and claims the benefit of the earliest available effective filing date(s) from the following listed application(s) (the "Related Applications") (e.g., aims earliest available priority dates for other than provisional patent applications or aims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 12/228,664, entitled SYSTEM AND METHOD FOR TRANSMITTING ILLUSORY IDENTIFICATION CHARACTERISTICS, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Aug. 14, 2008, which is currently co-pending, or is an application of which a currently co-pending application is entitled to the benefit of the filing date.

For purposes of the USPTO, extra-statutory requirements, the present application constitutes a continuation-in-part of U.S. patent application Ser. No. 12/228,873, entitled SYSTEM AND METHOD FOR TRANSMITTING ILLUSORY AND NON-ILLUSORY IDENTIFICATION CHARACTERISTICS, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Aug. 15, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/287,268, entitled SYSTEM AND METHOD FOR TRANSMITTING ILLUSORY IDENTIFICATION CHARACTERISTICS, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Oct. 7, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/454,113, entitled SYSTEM AND METHOD FOR MODIFYING ILLUSORY USER IDENTIFICATION CHARACTERISTICS, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed May 12, 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/799,794, entitled SYSTEM AND METHOD FOR CONDITIONALLY TRANSMITTING ONE OR MORE LOCUM TENENTES, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Apr. 29, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/802,139, entitled OBFUSCATING IDENTITY OF A SOURCE ENTITY AFFILIATED WITH A COMMUNIQUÉ IN ACCORDANCE WITH CONDITIONAL DIRECTIVE PROVIDED BY A RECEIVING ENTITY, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed May 27, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/802,136, entitled OBFUSCATING IDENTITY OF A SOURCE ENTITY AFFILIATED WITH A COMMUNIQUÉ IN ACCORDANCE WITH CONDITIONAL DIRECTIVE PROVIDED BY A RECEIVING ENTITY, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed May 28, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/802,863, entitled OBFUSCATING IDENTITY OF A SOURCE ENTITY AFFILIATED WITH A COMMUNIQUÉ DIRECTED TO A RECEIVING USER AND IN ACCORDANCE WITH CONDITIONAL DIRECTIVE PROVIDED BY THE RECEIVING USER, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Jun. 14, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/802,922, entitled OBFUSCATING IDENTITY OF A SOURCE ENTITY AFFILIATED WITH A COMMUNIQUÉ DIRECTED TO A RECEIVING USER AND IN ACCORDANCE WITH CONDITIONAL DIRECTIVE PROVIDED BY THE RECEIVING USER, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Jun. 15, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/804,765, entitled OBFUSCATING RECEPTION OF COMMUNIQUÉ AFFILIATED WITH A SOURCE ENTITY, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Jul. 27, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/804,832, entitled OBFUSCATING RECEPTION OF COMMUNIQUÉ AFFILIATED WITH A SOURCE ENTITY, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Jul. 28, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/806,677, entitled OBFUSCATING RECEPTION OF COMMUNIQUÉ AFFILIATED WITH A SOURCE ENTITY IN RESPONSE TO RECEIVING INFORMATION INDICATING RECEPTION OF THE COMMUNIQUÉ, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Aug. 17, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/806,738, entitled OBFUSCATING RECEPTION OF COMMUNIQUÉ AFFILIATED WITH A SOURCE ENTITY IN RESPONSE TO RECEIVING INFORMATION INDICATING RECEPTION OF THE COMMUNIQUÉ, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Aug. 18, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/807,700, entitled CONDITIONALLY INTERCEPTING DATA INDICATING ONE OR MORE ASPECTS OF A COMMUNIQUÉ TO OBFUSCATE THE ONE OR MORE ASPECTS OF THE COMMUNIQUÉ, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Sep. 9, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/807,701, entitled CONDITIONALLY INTERCEPTING DATA INDICATING ONE OR MORE ASPECTS OF A COMMUNIQUÉ TO OBFUSCATE THE ONE OR MORE ASPECTS OF THE COMMUNIQUÉ, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Sep. 10, 2010, which is currently co-pending, or is an application of which a currently co-pending application is entitled to the benefit of the filing date.

For purposes of the USPTO extra-statutory requirements, the present application constitutes a continuation of U.S. patent application Ser. No. 12/924,992, entitled CONDITIONALLY RELEASING A COMMUNIQUÉ DETERMINED TO BE AFFILIATED WITH A PARTICULAR SOURCE ENTITY IN RESPONSE TO DETECTING OCCURRENCE OF ONE OR MORE ENVIRONMENTAL ASPECTS, naming Alexander J. Cohen; Edward K. Y. Jung; Royce A. Levien; Robert W. Lord; Mark A. Malamud; William H. Mangione-Smith; John D. Rinaldo, Jr. and Clarence T. Tegreene as inventors, filed Oct. 8, 2010, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

SUMMARY

A computationally implemented method includes, but is not limited to intercepting a communiqué that is determined to be affiliated with a source entity and that is addressed to an end user to prevent, at least temporarily, the communiqué from being received by a communication device associated with the end user; and releasing the communiqué to the communication device in response to at least detecting occurrence of one or more environmental aspects associated with the communication device, the releasing of the communiqué being in accordance with one or more conditional directives of the end user to conditionally obfuscate the communiqué determined to be affiliated with the source entity. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

A computationally implemented system includes, but is not limited to: means for intercepting a communiqué that is determined to be affiliated with a source entity and that is addressed to an end user to prevent, at least temporarily, the communiqué from being received by a communication device associated with the end user; and means for releasing the communiqué to the communication device in response to at least detecting occurrence of one or more environmental aspects associated with the communication device, the releasing of the communiqué being in accordance with one or more conditional directives of the end user to conditionally obfuscate the communiqué determined to be affiliated with the source entity. In addition to the foregoing, other system aspects are described in the claims, drawings, and text forming a part of the present disclosure.

A computationally implemented system includes, but is not limited to: circuitry for intercepting a communiqué that is determined to be affiliated with a source entity and that is addressed to an end user to prevent, at least temporarily, the communiqué from being received by a communication device associated with the end user; and circuitry for releasing the communiqué to the communication device in response to at least detecting occurrence of one or more environmental aspects associated with the communication device, the releasing of the communiqué being in accordance with one or more conditional directives of the end user to conditionally obfuscate the communiqué determined to be affiliated with the source entity. In addition to the foregoing, other system aspects are described in the claims, drawings, and text forming a part of the present disclosure.

An article of manufacture comprising a signal-bearing non-transitory storage medium bearing one or more instructions for intercepting a communiqué that is determined to be affiliated with a source entity and that is addressed to an end user to prevent, at least temporarily, the communiqué from being received by a communication device associated with the end user; and one or more instructions for releasing the communiqué to the communication device in response to at least detecting occurrence of one or more environmental aspects associated with the communication device, the releasing of the communiqué being in accordance with one or more conditional directives of the end user to conditionally obfuscate the communiqué determined to be affiliated with the source entity. In addition to the foregoing, other computer program product aspects are described in the claims, drawings, and text forming a part of the present disclosure.

A method for obfuscating a communiqué that is directed to an end user entity and that is determined to be affiliated with a source entity, the method includes intercepting, by a network device, a communiqué that is determined to be affiliated with a source entity and that is addressed to an end user to prevent, at least temporarily, the communiqué from being received by a communication device associated with the end user; and releasing, by the network device, the communiqué to the communication device in response to at least detecting occurrence of one or more environmental aspects associated with the communication device, the releasing of the communiqué being in accordance with one or more conditional directives of the end user to conditionally obfuscate the communiqué determined to be affiliated with the source entity.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1A:
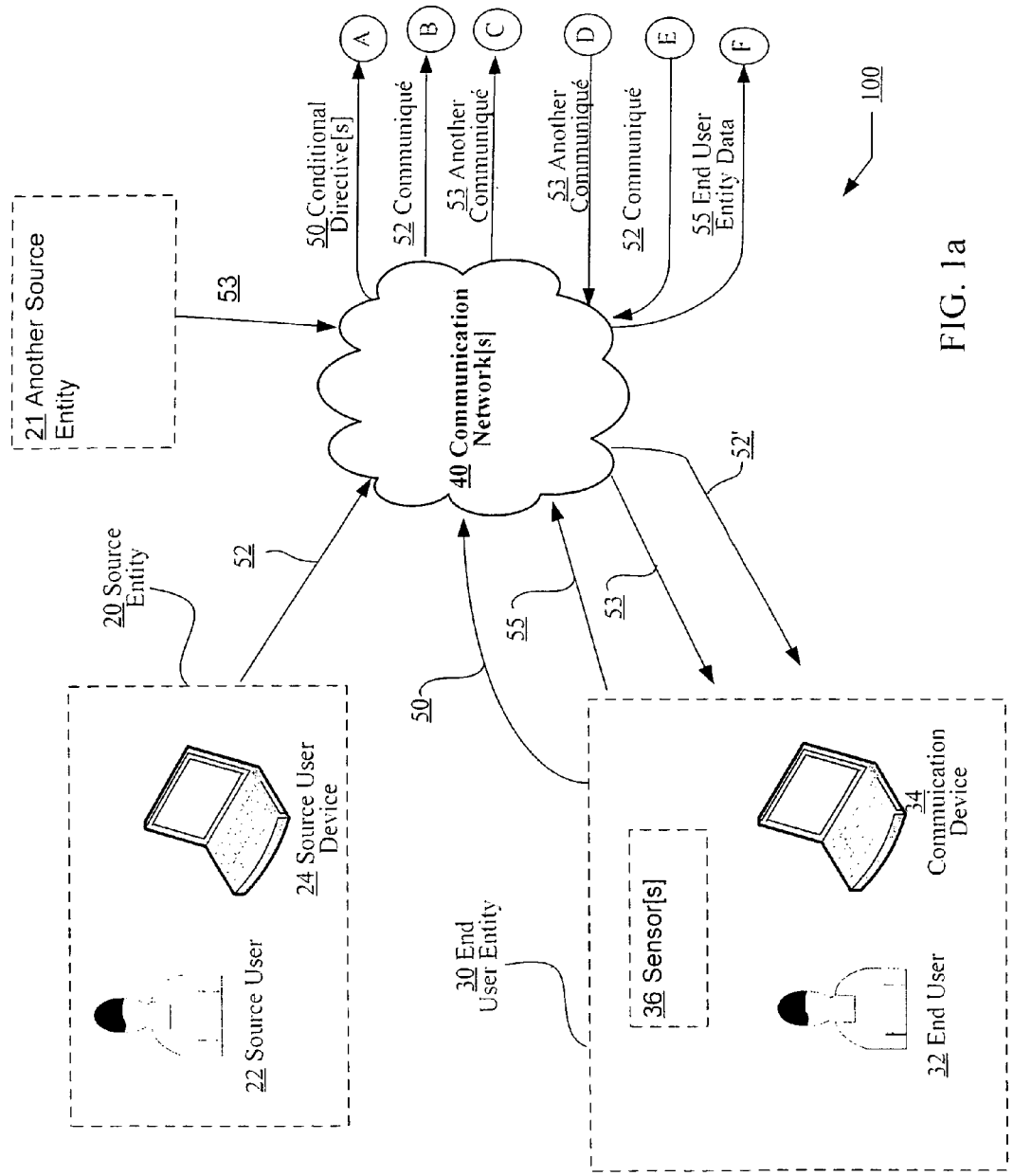
FIGS. 1a and 1b show a high-level block diagram of a network device 10 operating in a network environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

In recent years, the computing/communication industry has enjoyed dramatic technological advancement and spectacular commercial popularity, providing numerous benefits for those who have chosen to take advantage of such technological advancements. For example, with the rapid development of personal communication devices such as cellular telephones, personal digital assistants (PDAs), Smartphones, laptop computers, desktop computers, and so forth, users of such devices are now able to maintain 24/7 connectivity with other users at relatively low costs. Such connectivity may be via a variety of communication channels including, for example, telephone calls, emails, Voice over Internet Protocol (VoIP) calls, text messaging (e.g., short message service or SMS, or multimedia messaging service or MMS), instant messaging (IM), and so forth. Unfortunately, in addition to providing significant benefits to users, users of such technologies must also deal with a whole new slate of issues and problems that have also arisen with these new technologies.

For example, users of such personal communication devices (e.g., cellular telephones, Smartphones, laptop and desktop computers, and so forth) face a number of privacy and security issues. One such issue that has surfaced with respect to users of personal communication devices is that communiqués (e.g., electronic communications including, for example, telephone calls, VoIP, emails, text messages, IMs, and so forth) received through these personal communication devices are often easily accessible by those other than the primary users (e.g., owners) of such devices. As a result, highly sensitive communiqués (e.g., confidential personal or business communiqués) that are directed to the primary users of such devices, as well as information that indicates various aspects of such communiqués, may often be accessed by others potentially causing embarrassing if not devastating consequences.

For example, it was extensively reported recently that a well-known and well-admired professional athlete was discovered having an extramarital affair by his spouse. It was widely reported that the spouse discovered this affair when she found a voice message from her husband's mistress on her husband's cellular telephone. Because the husband (i.e., famous professional athlete) in that incident had not erased or was not able to hide or disguise the voice message from his mistress, the husband had to endure considerable public humiliation and substantial financial loss due to loss of commercial endorsement income.

Of course the need to maintain communication secrecy is not just limited to personal situations, but may also be necessary in professional/business context. For example, it may be inappropriate for a person to receive certain sensitive communiqués from particular parties (e.g., communiqués from certain clients or competitors, or communiqués from a particular website or business) while at work or while at other locations (e.g., when meeting with clients).

According to various embodiments, methods, systems, and computer program products are provided for obfuscating existence of a communiqué that has been determined to be affiliated with a particular source entity and that is directed to an end user by at least intercepting (e.g., diverting or capturing) the communiqué to prevent, at least temporarily, the communiqué from being received by a communication device associated with the end user, and to confidentially release (e.g., transmit or provide access to) the communiqué to the communication device only after detecting occurrence of at least one or more particular environmental aspects associated with the communication device. In various embodiments, the release of the communiqué being in accordance with one or more conditional directives of the end user to conditionally obfuscate the communiqué determined to be affiliated with the source entity (e.g., to at least conceal the existence of the communiqué determined to be affiliated with one or more third parties). In some embodiments, the one or more particular "environmental aspects" associated with the communication device that may be detected may be related to aspects of the environment that the communication device exists in that may directly or indirectly indicate that one or more third parties are not within (e.g., outside) the proximate vicinity of the communication device.

As will be further described herein, the methods, systems, and computer program products may be implemented at a network device, which may comprise of one or more network servers. Note that for purposes of this description, and unless indicated otherwise, the term "network server" may be broadly interpreted and may be in reference to a wide variety of network devices designed to facilitate in the transmission, directing, processing, routing, and/or storing of communiqués including, for example, routers, switches, telephone exchanges, storage devices, and so forth.

For purposes of the following description, a "communiqué" may be in reference to any one of a variety of electronic communication means including, for example, a visual textual communiqué such as an email message, a text message (e.g., short message service "SMS" or multimedia messaging service "MMS"), an instant message (IM), and so forth, or an audio communiqué such as telephone call, a Voice over Internet Protocol (VoIP) call, a voice message, a video message, and so forth.

As will be further described herein, a "source entity" may be in reference to any entity affiliated with a communiqué that an end user, for example, wishes to obfuscate the identity of. In some instances, a source entity may be the original or an intermediate source for the communiqué. In some cases, a source entity may include, for example, a source user who may be a human or robotic user and/or a source user device such as a cellular telephone, Smartphone, laptop or desktop computer, and so forth. In some cases, a source entity may be an organization such as a business or a trade or interest group. In some instances, a source entity may be a website.

An "end user" may be a human or robotic user that is designated to receive one or more communiqués. In some cases where the end user is a robotic user, the robotic user may be a network device such as a network server for, for example, a voicemail service, a text messaging service, or a web-based application service. In some cases, an end user may receive one or more communiqués from a variety of sources through a "communication device" (which may also be referred to as a "receiving device"). A communication device may be any type of computing device that is designed to transmit/receive communiqués including, for example, a cellular telephone, a Smartphone, a personal digital assistant (PDA), a landline telephone, a laptop or desktop computer, a tablet computer, a workstation, and so forth.

A "conditional directive," as will be discussed herein, may relate to a command or instruction to execute one or more actions when one or more conditions have occurred and/or detected. Thus, and for purposes of this description, a conditional directive may identify the one or more conditions that may cause the interception (e.g., seizing and holding) of a communiqué (e.g., when the communiqué is affiliated with a particular source entity and is addressed to a particular end user), and/or identify the necessary or requisite conditions (e.g., temporal and/or locational conditions) that may trigger the eventual release (e.g., transmission and/or provided access) of the communiqué to a communication device associated with the end user. In some cases, a conditional directive may be a command to intercept (e.g., hold without releasing or "withholding") a communiqué that is being transmitted to an end user entity (e.g., an end user and/or a communication device belonging to the end user) when the communiqué is determined to be affiliated with a particular source entity, and to release the communiqué to the communication device only upon detecting occurrence of one or more particular environmental aspects associated with the communication device.

In various embodiments, the one or more particular "environmental aspects" that need to be detected before an intercepted communiqué is to be released to a communication device (e.g., a communication device associated with the end user that the communiqué is addressed to) may be in reference to one or more aspects of the contextual environment that the communication device exists in. In some embodiments, such particular environmental aspects may directly or indirectly indicate that it may be "safe" to transmit a communiqué determined to be affiliated with a particular source entity to the communication device without fear of the communiqué being accessed (e.g., viewed/heard/sensed) by one or more third parties.

In some cases, such environmental aspects may directly or indirectly indicate that one or more particular third parties (who the end user may wish to conceal the communiqué from) are not in the "proximate vicinity" of the communication device such that the one or more particular third parties will not be able to hear, see, and/or sense a communiqué being presented through the communication device. The "proximate vicinity" of the communication device, for purposes of the following discussion, may be any spatial area around the communication device from which a third party may hear, see, and/or sense a communiqué being presented through the communication device. In this case, and depending upon circumstances, the proximate vicinity of the communication device may be the spatial area within five feet, ten feet, or within some other maximum distance from the communication device from which a third party can hear, see and/or sense communiqués being presented through the communication device. In alternative implementations, the "proximate vicinity" of the communication device may be the spatial area around the communication device that an imbedded sensor (e.g., many of today's communication devices come with a variety of sensors, such as a microphone and an image capturing device) can detect the presence or absence of a third party.

As briefly indicated above, there are at least two types of environmental aspects that may be of interest here. The first type of environmental aspects that may be of interest here are environmental aspects that imply (e.g., indirectly indicates) that one or more third parties are not within the proximate vicinity of the communication device (e.g., the communication device that is associated with the end user that the communiqué is directed to). An example of such an environmental aspect is an aspect related to the temporal characteristic of the communication device that may indicate the particular time of day or calendar year with respect to the communication device (and its immediate surrounding environment) that implies that the one or more third parties will not be in the proximate vicinity of the communication device. For example, suppose an employee (e.g., an end user) wishes to keep certain communiqués from a potential new employer from being seen or heard by his current boss (e.g., third party in the above discussion). In this scenario, a communiqué that is determined to be affiliated with a potential new employer may be intercepted and may not be released to a communication device associated with the employee at least until the communication device has been determined to have "reached" the weekend (since the boss will not likely be in the proximate vicinity of the communication device during the weekend).

Another example of another environmental aspect that implies that one or more third parties are not within the proximate vicinity of the communication device is the spatial aspect (e.g., locational aspect) related to the communication device with respect to its environment. For example, in the above employee/boss example, the communiqué that is determined to be affiliated with the potential new employer may only be released to the communication device only when it is determined that the communication device is at the home residence of the employee (since the boss will not likely be in the proximate vicinity of the communication device when the communication device is at the home residence of the employee).

The second type of environmental aspects that may be of interest here are environmental aspects that directly indicate that the one or more particular third parties are not within the proximate vicinity of the communication device (e.g., the communication device that is associated with the end user that the communiqué is directed to). As will be further described herein, such environmental aspects may be indicated by a variety of means including, for example, sensor provided data (e.g., image and/or audio data) or end user provided log entry data that may be entered by the end user using, for example, social networking application or a personal information management application (e.g., Microsoft Office) that indicates that the one or more particular third parties are not within the proximate vicinity of the communication device.

Figure 1B:
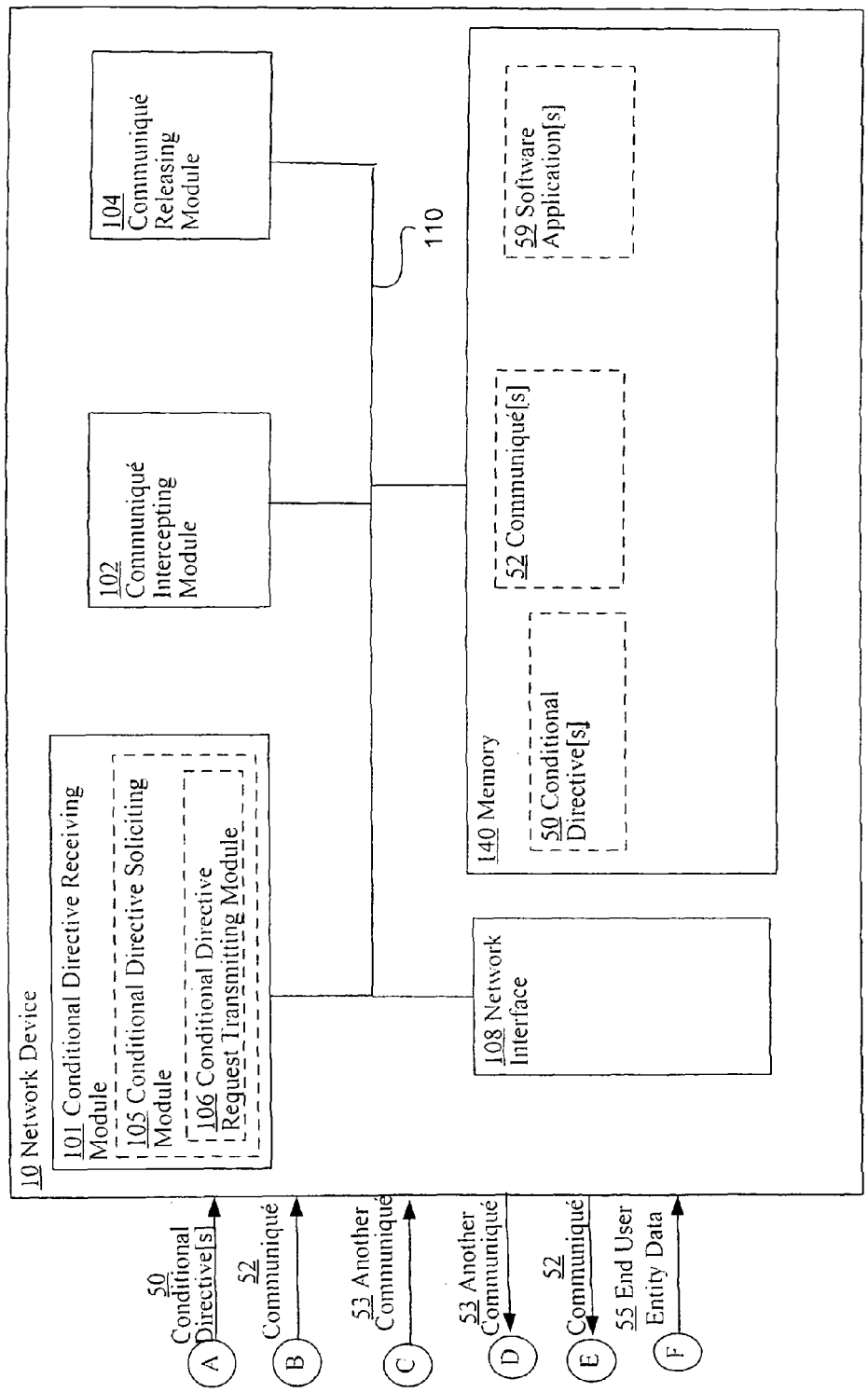

Turning now to FIGS. 1a, and 1b illustrating an example environment 100 in which the methods, systems, circuitry, and computer program products in accordance with various embodiments may be implemented by or at a network device 10. Among other things, the methods, systems, circuitry, and computer program products implemented by the network device 10 may be designed to intercept a communiqué 52 that is determined to be affiliated with a source entity 20 and that is addressed to an end user 32 to prevent, at least temporarily, the communiqué 52 from being received by a communication device 34 associated with the end user 32; and to release (e.g., provide access to and/or transmit) the communiqué 52 to the communication device 34 in response to at least detecting occurrence of one or more environmental aspects associated with the communication device 34. In some embodiments, the releasing of the communiqué 52 may be in accordance with one or more conditional directives 50 that may be directly or indirectly provided by the end user 32 to conditionally obfuscate the communiqué 52 determined to be affiliated with the source entity 20. In some embodiments, the network device 10 may be a network system located at a single network site or located at multiple network sites such as in the case of cloud computing. In some embodiments, the interception of the communiqué 52 may involve selectively intercepting the communiqué 52 that was determined to be affiliated with the source entity 20 and addressed to the end user 32 while allowing other communiqués 52 (e.g., another communiqué 53) that are addressed to the end user 32 but determined not be affiliated with the source entity 20 to pass through to the communication device 34 of the end user 32.

In various embodiments, the network device 10 may include one or more network servers including one or more telephone switches, one or more telephone exchanges, and/or one or more routers. In some embodiments, the network device 10 may comprise of multiple network components such as in the case of cloud computing.

In some embodiments, the network device 10 may be designed to facilitate communication between different entities. For example, in some cases, the network device 10 may be designed to relay communiqués 52/53 (e.g., emails, text messages, IMs, telephone calls, VoIP calls, voice message, and/or video messages) between, for example, a source entity 20, another source entity 21, and/or an end user entity 30 via one or more communication networks 40. A source entity 20 may comprise of a human or robotic source user 22 and/or a source user device 24 (e.g., a laptop computer, a desktop computer, a workstation, a Smartphone, a cellular telephone, a personal digital assistant (PDA), or other computing/communication devices). From another perspective, the source entity 20 may be a website or an organization such as a business, a social group, a trade/technical group, or an interest group. In some cases, the source entity 20 may include a global positioning system (GPS), which may be part of the source user device 24.

Similarly, an end user entity 30 may comprise an end user 32 who may be a human or robotic user and a communication device 34 (e.g., a laptop computer, a workstation, a Smartphone, a PDA, a desktop computer, a cellular telephone, and so forth). In some cases, the end user entity 30 may be a voicemail service, a text messaging service, a web-based application service, and so forth that may be associated with, for example, an end user 32.

As briefly described above, the network device 10 may be designed to facilitate the relay of communiqué 52 between the source entity 20, another source entity 21, and the end user entity 30 via one or more communication networks 40. The one or more communication networks 40 may include one or more of a local area network (LAN), metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, a Client/Server network, a virtual private network (VPN), and so forth.

Referring back to the example environment 100 of FIGS. 1a and 1b, in various embodiments, the network device 10 may be designed to receive one or more conditional directives 50 either directly or indirectly from an end user entity 30 (e.g., from an end user 32 of the end user entity 30) via one or more communication networks 40. The one or more conditional directives 50 to be received may indicate the specific conditions that are required and/or the specific acts that may be executed in order to obfuscate a communiqué 52 that is determined to be affiliated with a particular source entity 20 and that is addressed to the end user entity 30. In some cases, the one or more conditional directives 50 may be solicited from the end user 32.

As further illustrated in FIG. 1a and 1b, the network device 10 may also be designed to receive and to intercept, in accordance with the one or more conditional directives 50, a communiqué 52 that has been determined to be affiliated with a particular source entity 20 and that is addressed to an end user 32. In various implementations, the communiqué 52 may be intercepted in order to prevent, at least temporarily, the communiqué 52 from reaching the communication device 34 associated with the end user 32. In addition to intercepting the communiqué 52 in order to prevent the communiqué 52 from reaching the communication device 34, the network device 10 may withhold and not release the communiqué 52 at least until detecting occurrence of one or more particular environmental aspects associated with the communication device 34 that may indirectly or directly indicate that the communiqué 52 may be safely transmitted to the communication device 34 without fear of such a communiqué 52 being accessed by one or more third parties. In some embodiments, the release of the communiqué 52 to the communication device 34 may be in accordance with the one or more conditional directives 50 of the end user 32.

In order to determine whether the one or more particular environmental aspects associated with the communication device 34 has occurred, the network device 10 may receive and process end user entity data 55 from the communication device 34 that may indicate the occurrence of the one or more particular environmental aspects. The end user entity data 55 that may be received by the network device 10 may include, among other things, sensor provided data (e.g., as provided by a sensor device such as an image capturing device such as a digital camera or webcam, and/or an audio capturing device such as a microphone), or may include, for example, log entry data (e.g., diary entries, microblog entries, social networking website entries, and so forth) provided by the end user 32. In some cases, the end user entity data 55 received by the network device 10 may include entries entered through a personal information management application (e.g., Microsoft Outlook) that may indicate, for example, the appointment schedule of the end user 32 which may indicate when the end user 32 will meet, for example, the one or more third parties that the end user 32 may wish to conceal the communiqué 52 from.

Turning specifically now to the network device 10 of FIG. 1b. The network device 10, as depicted, may include a variety of modules, sub-modules, and various other components. The network device 10, in some embodiments, may be a single network device such as a single server, which may be a single router, a single telephone switch, or some other network device 10 located at a single network site. Alternatively, the network device 10 may be a collection of network component devices including a collection of multiple servers located at one network site or located at multiple network sites such as the case in cloud computing. Thus, the network device 10 may be implemented at a single network site or at multiple network sites using a single server or multiple servers. Note that for ease of illustration and explanation, the network device 10 that is illustrated in FIG. 1b is depicted as a single server device. However, and as indicated earlier, the network device 10 may be a network system that may be implemented using, for example, multiple network servers such as in the case of cloud computing.

Figure 2A:
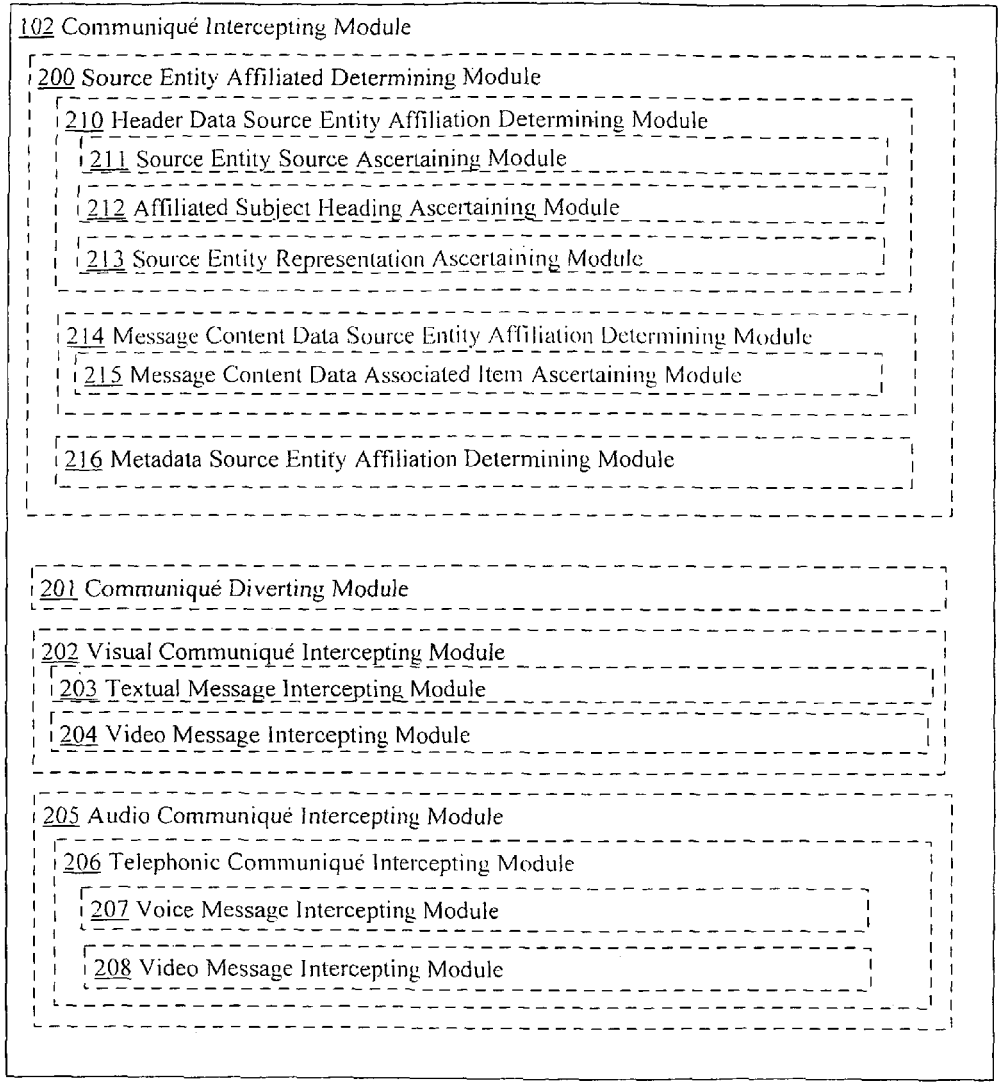
FIG. 2a shows another perspective of the communiqué intercepting module 102 of the network device 10 of FIG. 1b.
Figure 2B:
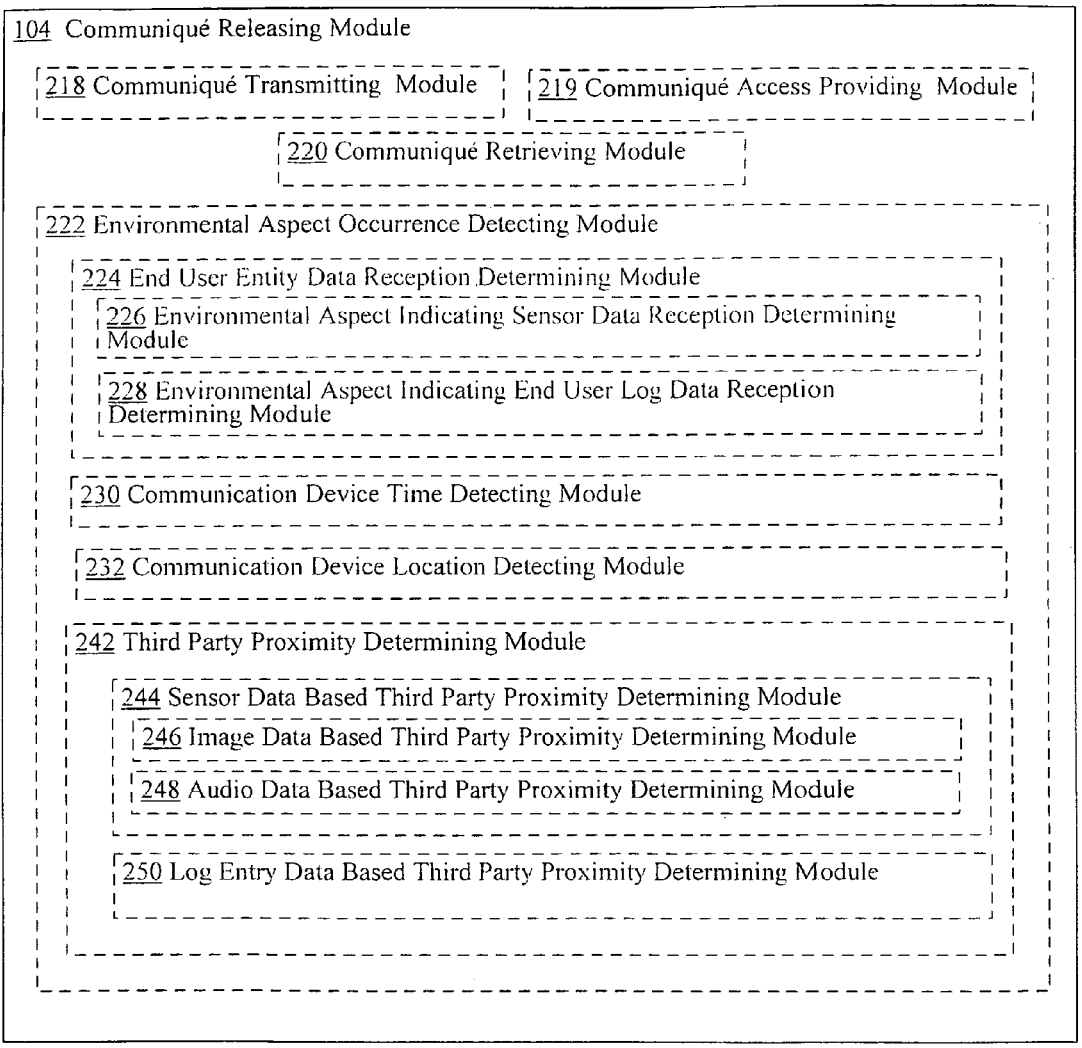
FIG. 2b shows another perspective of the communiqué releasing module 104 of the network device 10 of FIG. 1b.

As shown, the network device 10 may include at least a communiqué intercepting module 102 (which may further include one or more sub-modules as illustrated in FIG. 2a) and a communiqué releasing module 104 (which may further include one or more sub-modules as illustrated in FIG. 2b). As further illustrated, in some embodiments, the network device 10 may include a conditional directive receiving module 101 (which may further include a conditional directive soliciting module 105 that may further comprise of a conditional directive request transmitting module 106).

In brief, the conditional directive receiving module 101 may be configured to receive one or more conditional directives 50 from an end user entity 30 (e.g. end user 32 of the end user entity 30). In contrast, the communiqué intercepting module 102 may be configured to intercept a communiqué 52 addressed to an end user 32 and that has been determined to be affiliated with a source entity 20 to prevent, at least temporarily, the communiqué 52 from reaching a communication device 34 that is associated with the end user 32. The communiqué releasing module 104 may be configured to release, in response to at least detecting occurrence of one or more environmental aspects associated with the communication device 34, the communiqué 52 to the communication device 34. In various embodiments, the releasing of the communiqué 52 by the communiqué releasing module 104 being in accordance with one or more conditional directives of the end user 32 to conditionally obfuscate the communiqué 52 that has been determined to be affiliated with the source entity 20. Note that a more detailed discussion related to the communiqué intercepting module 102, the communiqué releasing module 104, the conditional directive receiving module 101, and all their sub-modules will be provided below with respect to the operations and processes to be described herein.

In various embodiments, the network device 10 may include a network interface 108 (e.g., network interface card or NIC) and/or a memory 140. Although not depicted, the network device 10 may also include other components such as one or more processors (e.g., microprocessors) and one or more user interfaces. In various embodiments, the various modules depicted as being included in the network device 10 of FIG. 1b including the communiqué intercepting module 102, the communiqué releasing module 104, and their sub-modules (as depicted in FIGS. 2a and 2b), may be implemented using hardware (e.g., circuitry), software, firmware, or any combination thereof.

For example, in some embodiments, the communiqué intercepting module 102, the communiqué releasing module 104, and the conditional directive receiving module 101 (and their sub-modules) may be implemented using hardware such as specially designed circuitry including, for example, application specific integrated circuit or ASIC. Alternatively, the communiqué intercepting module 102, the communiqué releasing module 104, and the conditional directive receiving module 101 (and their sub-modules) may be implemented using software in the form of computer readable instructions that is executed by one or more processors as will be further described below with respect to FIG. 7. In still other embodiments, the communiqué intercepting module 102, the communiqué releasing module 104, and/or the conditional directive receiving module 101 (and their sub-modules) may be implemented using a combination of hardware and software such as when the communiqué intercepting module 102, the communiqué releasing module 104, and the conditional directive receiving module 101 (and their sub-modules) are implemented using Field Programmable Gate Arrays or FPGAs. Note that FIG. 1b depicts the hardware implementation of the network device 10. That is, the communiqué intercepting module 102, the communiqué releasing module 104, and the conditional directive receiving module 101 that are illustrated in FIG. 1b are each depicted as being implemented by circuits that along with the network interface 108 and the memory 140 may be coupled together by, for example, a bus 110.

Again, note that for ease of illustration and understanding, FIG. 1b illustrates a single device embodiment of the network device 10 (e.g., meaning that the network device 10 that is depicted in FIG. 1b is depicted as being embodied in a single network component device such as a single server rather than being embodied by multiple servers as in the case of cloud computing). However, those having ordinary skill in the art will recognize that the network device 10 may be implemented using multiple network component devices (e.g., multiple servers) located at multiple network sites such as in the case in cloud computing.

Further note that although FIG. 1b illustrates only the hardware embodiment of the network device 10, those having ordinary skill in the art will recognize that the communiqué intercepting module 102, the communiqué releasing module 104, and the conditional directive receiving module 101 (and their sub-modules as illustrated in FIGS. 1b, 2a and 2b) may also be implemented using software, firmware, or any combination of hardware, software, and firmware. Further, one or more of the modules of the network device 10 including the communiqué intercepting module 102, the communiqué releasing module 104, and the conditional directive receiving module 101 (and their sub-modules) may be located at different network sites as is the case in cloud computing.

In various embodiments, and as previously alluded to, the network device 10 may include a memory 140 for storing various types of data. For these embodiments, memory 140 may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, memory 140 may be located at a single network site. Alternatively, memory 140 may be located at multiple network sites. In some embodiments, memory 140 may be located at the same network site that one or more of the modules (e.g., the communiqué intercepting module 102, the communiqué releasing module 104, and/or the conditional directive receiving module 101) of the network device 10 may be located at. Alternatively, memory 140 may be located at a separate network site from the network site where the one or more of the modules of the network device 10 may be located.

The memory 140 may store a variety of data in various alternative embodiments. For example, in some embodiments, memory 140 may store one or more conditional directives 50, one or more communiqués 52, and/or one or more software applications 59. Examples of software applications 59 include applications that may be used in order to process end user entity data 55 received from the communication device 34 and to determine, for example, whether a particular third party is within the proximate vicinity of the communication device 34 of the end user 32. Examples of software applications 59 that may be stored in memory 140 may include, for example, a facial recognition system application, voice recognition system application, and so forth.

Referring now to FIG. 2a illustrating a particular implementation of communiqué intercepting module 102 of FIG. 1b. As illustrated, communiqué intercepting module 102 may include one or more sub-modules in various alternative implementations. For example, in various implementations, the communiqué intercepting module 102 may include a source entity affiliated determining module 200, a communiqué diverting module 201, a visual communiqué intercepting module 202 (which may further include a textual message intercepting module 203 and/or a video message intercepting module 204), and/or an audio communiqué intercepting module 205 that may further include a telephonic communiqué intercepting module 206 (which may further comprise a voice message intercepting module 207 and/or a video message intercepting module 208. In implementations where the communiqué intercepting module 102 includes the source entity affiliated determining module 200, the source entity affiliated determining module 200 may include a header data source entity affiliation determining module 210 (which may further include a source entity source ascertaining module 211, an affiliated subject heading ascertaining module 212 and/or a source entity representation ascertaining module 213), a message content data source entity affiliation determining module 214 (which may further include a message content data associated item ascertaining module 215), and/or a metadata source entity affiliation determining module 216.

As indicated earlier, each of the sub-modules of the communiqué intercepting module 102 may be implemented using hardware (e.g., circuitry), software (e.g., computer readable instructions executed by one or more processors), firmware, or any combination thereof. Specific details related to the communiqué intercepting module 102 as well as the above-described sub-modules of the communiqué intercepting module 102 will be provided below in reference to the operations and processes to be described herein.

Referring now to FIG. 2b illustrating a particular implementation of the communiqué releasing module 104 of FIG. 1b. As illustrated, the communiqué releasing module 104 may also include one or more sub-modules in various alternative implementations. For example, in some implementations, the communiqué releasing module 104 may include a communiqué transmitting module 218, a communiqué access providing module 219, a communiqué retrieving module 220, and/or an environmental aspect occurrence detecting module 222. In implementations where the communiqué releasing module 104 includes the environmental aspect occurrence detecting module 222, the environmental aspect occurrence detecting module 222 may include an end user entity data reception determining module 224 (which may further include an environmental aspect indicating sensor data reception determining module 226 and/or an environmental aspect indicating end user log data reception determining module 228), a communication device time detecting module 230, a communication device location detecting module 232, and/or a third party proximity determining module 242 that may further include a sensor data based third party proximity determining module 244 (which may further comprise an image data based third party proximity determining module 246 and/or an audio data based third party proximity determining module 248) and/or a log entry data based third party proximity determining module 250.

As previously indicated, each of the sub-modules of the communiqué releasing module 104 may be implemented using hardware (e.g., circuitry), software (e.g., computer readable instructions executed by one or more processors), firmware, or any combination thereof. Specific details related to the above-described sub-modules of the communiqué releasing module 104 will be provided below in reference to the operations and processes to be described herein.

Figure 3:
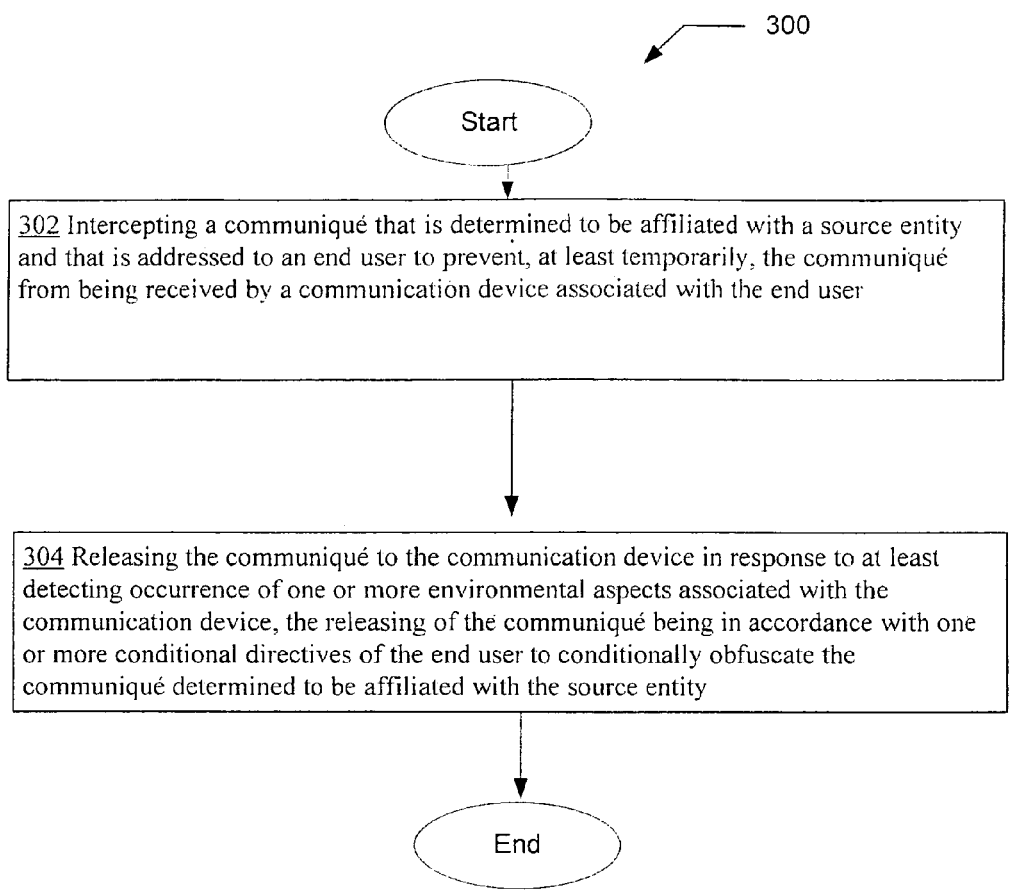
FIG. 3 is a high-level logic flowchart of a process.

A more detailed discussion related to the network device 10 of FIG. 1b will now be provided with respect to the processes and operations to be described herein. FIG. 3 illustrates an operational flow 300 representing example operations for, among other things, obfuscating a communiqué that is determined to be affiliated with a particular source entity and that is addressed to (e.g., directed to or being sent to) a particular end user entity by intercepting the communiqué in order to prevent, at least temporarily, the communiqué from reaching a communication device associated with the end user and releasing the communiqué to the communication device only after detecting occurrence of one or more environmental aspects associated the communication device. In FIG. 3 and in the following figures that include various examples of operational flows, discussions and explanations will be provided with respect to the exemplary environment 100 described above and as illustrated in FIGS. 1a and 1b, and/or with respect to other examples (e.g., as provided in FIGS. 2a, 2b, and 7) and contexts. However, it should be understood that the operational flows may be executed in a number of other environments and contexts, and/or in modified versions of FIGS. 1a, 1b, 2a, 2b, and 7. Also, although the various operational flows are presented in the sequence(s) illustrated, it should be understood that the various operations may be performed in other orders other than those which are illustrated, or may be performed concurrently.

Further, in FIG. 3 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 3 as well as the other operations to be described herein may be performed by at least one of a machine, an article of manufacture, or a composition of matter.

In any event, after a start operation, the operational flow 300 of FIG. 3 may move to a communiqué intercepting operation 302 for intercepting a communiqué that is determined to be affiliated with a source entity and that is addressed to an end user to prevent, at least temporarily, the communiqué from being received by a communication device associated with the end user. For instance, and as an illustration, the communiqué intercepting module 102 including the source entity affiliated determining module 200 (see FIG. 2a) of the network device 10 of the example environment 100 of FIGS. 1a and 1b intercepting (e.g., diverting, redirecting, capturing, storing, holding, and/or seizing) a communiqué 52 (e.g., an email, a text message, an instant message, a voice message, a video message, and so forth) that is determined by the source entity affiliated determining module 200 to be affiliated with a source entity 20 and that is addressed to (e.g., directed to or sent to) an end user 32 to prevent, at least temporarily, the communiqué 52 from being received by a communication device 34 (e.g., a cellular telephone, a Smartphone, a lap or desktop computer, a PDA, and so forth) associated with the end user 32.

In addition to the communiqué intercepting operation 302, operational flow 300 may also include a communiqué releasing operation 304 for releasing the communiqué to the communication device in response to at least detecting occurrence of one or more environmental aspects associated with the communication device, the releasing of the communiqué being in accordance with one or more conditional directives of the end user to conditionally obfuscate the communiqué determined to be affiliated with the source entity as further illustrated in FIG. 3. For instance, the communiqué releasing module 104 including the environmental aspect occurrence detecting module 222 (see FIG. 2b) of the network device 10 of FIG. 1b releasing (e.g., transmitting, publishing, distributing, and/or allowing access to) the communiqué 52 to the communication device 34 in response to at least the environmental aspect occurrence detecting module 222 detecting occurrence of one or more environmental aspects associated with the communication device 34 (e.g., characteristics or events associated with the environment surrounding the communication device 34 rather than, for example, events or aspects related only to the communication device 34), the releasing of the communiqué 52 being in accordance with one or more conditional directives 50 of the end user 32 to conditionally obfuscate the communiqué 52 determined to be affiliated with the source entity 20. As will be further described herein, the communiqué 52 may be released to the communication device 34 in response to the environmental aspect occurrence detecting module 222 detecting occurrence of one or more aspects associated with the environment surrounding the communication device 34. Examples of the type of environmental aspects that when detected may cause the communiqué 52 to be released include, for example, the spatial aspect (e.g., geographic location) of the communication device 34, the temporal aspect (e.g., the specific time) with respect to the communication device 34, and environmental aspects that may directly indicate the presence or absence of one or more third parties within a proximate vicinity (e.g., within five feet, ten feet, or within some other maximum distance from which a third party can hear, see, and/or sense a communiqué 52 being presented through the communication device 34) of the communication device 34, and so forth.

Figure 4A:
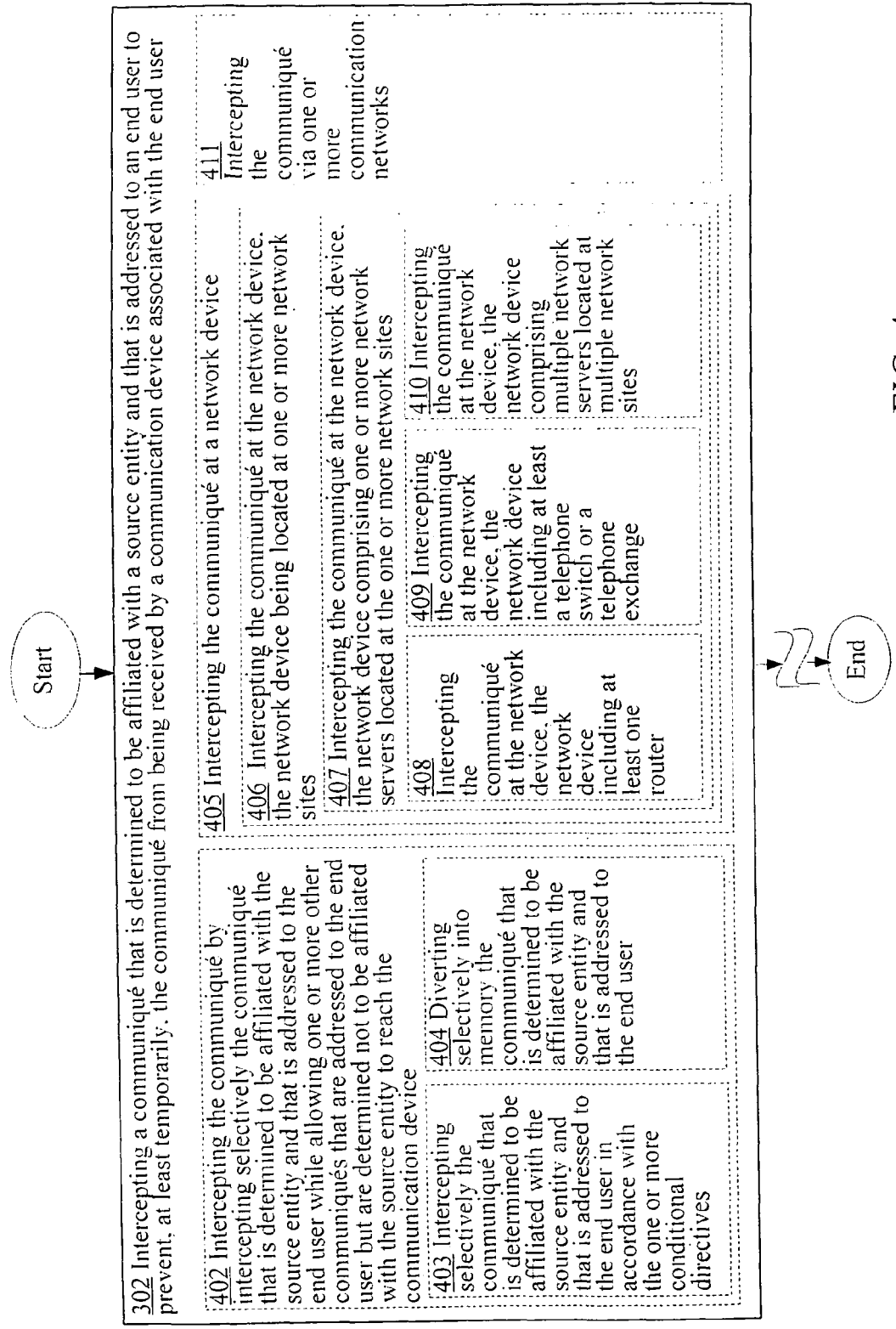
FIG. 4a is a high-level logic flowchart of a process depicting alternate implementations of the communiqué intercepting operation 302 of FIG. 3.

As will be further described herein, the communiqué intercepting operation 302 and the communiqué releasing operation 304 of FIG. 3 may be executed in a variety of different ways in various alternative implementations. FIGS. 4a, 4b, 4c, and 4d, for example, illustrate some of the alternative ways that the communiqué intercepting operation 302 of FIG. 3 may be executed in various alternative implementations. For example, in various implementations, the communiqué intercepting operation 302 of FIG. 3 may include an operation 402 for intercepting the communiqué by intercepting selectively the communiqué that is determined to be affiliated with the source entity and that is addressed to the end user while allowing one or more other communiqués that are addressed to the end user but are determined not to be affiliated with the source entity to reach the communication device as depicted in FIG. 4a. For instance, the communiqué intercepting module 102 including the source entity affiliated determining module 200 of the network device 10 of FIG. 1b intercepting the communiqué 52 by selectively intercepting the communiqué 52 that is determined by the source entity affiliated determining module 200 to be affiliated with the source entity 20 (e.g., source user 22) and that is addressed to the end user 32 while allowing one or more other communiqués 53 that are addressed to the end user 32 but are determined by the source entity affiliated determining module 200 not to be affiliated with the source entity 20 to reach (e.g., receive or acquire by) the communication device 34.

In some implementations, operation 402 may further include an operation 403 for intercepting selectively the communiqué that is determined to be affiliated with the source entity and that is addressed to the end user in accordance with the one or more conditional directives as further depicted in FIG. 4a. For instance, the communiqué intercepting module 102 including the source entity affiliated determining module 200 of the network device 10 of FIG. 1b selectively intercepting the communiqué 52 that is determined by the source entity affiliated determining module 200 to be affiliated with the source entity 20 and that is addressed to the end user 32 in accordance with the one or more conditional directives 50 (e.g., one or more conditional directives 50 that may at least identify the source user 22 of the source entity 20).

As further illustrated in FIG. 4a, operation 402 may additionally or alternatively include an operation 404 for diverting selectively into memory the communiqué that is determined to be affiliated with the source entity and that is addressed to the end user. For instance, the communiqué diverting module 201 (see FIG. 2a) of the network device 10 of FIG. 1b diverting (e.g., redirecting) selectively into memory 140 (e.g., volatile or non-volatile memory including flash memory, DRAM, SRAM, EPROM, and so forth) the communiqué 52 that is determined to be affiliated with the source entity 20 and that is addressed to (e.g., directed to or being sent to) the end user entity 30.

In some cases, the communiqué intercepting operation 302 of FIG. 3 may include an operation 405 for intercepting the communiqué at a network device as further depicted in FIG. 4a. For instance, the network device 10 of FIG. 1b, which may be a single network component device such as a server that may be located at a single network site or a network system that includes multiple network component devices located at multiple network sites such as in the case of cloud computing, intercepting the communiqué 52.

As further illustrated in FIG. 4a, operation 405 may include one or more additional operations in various alternative implementations. For example, in some implementations, operation 405 may include an operation 406 for intercepting the communiqué at the network device, the network device being located at one or more network sites as further depicted in FIG. 4a. For instance, the network device 10 of FIG. 1b intercepting the communiqué 52 when the network device 10 is a single server device located at a network site, or when the network device 10 is comprised of multiple network component devices located at multiple network sites such as in the case of cloud computing.

In some implementations, operation 406 may, in turn, include an operation 407 for intercepting the communiqué at the network device, the network device comprising one or more network servers located at the one or more network sites. For instance, the network device 10 of FIG. 1b intercepting the communiqué 52, the network device 10 comprising one or more network servers located at the one or more network sites.

Operation 407 may further include, in some cases, an operation 408 for intercepting the communiqué at the network device, the network device including at least one router. For instance, the network device 10 of FIG. 1b intercepting the communiqué 52 when the network device 10 includes at least one router such as when the network device 10 is a router device or when the network device 10 is a network system that includes at least one router.

In the same or different implementations, operation 407 may include an operation 409 for intercepting the communiqué at the network device, the network device including at least a telephone switch or a telephone exchange. For instance, the network device 10 of FIG. 1b intercepting the communiqué 52 when the network device 10 includes at least a telephone switch or a telephone exchange.

In various implementations the communiqué intercepting operation 302 of FIG. 3 may include an operation 410 for intercepting the communiqué at the network device, the network device comprising multiple network servers located at multiple network sites. For instance, the network device 10 of FIG. 1b intercepting the communiqué 52 when the network device comprises multiple network servers located at multiple network sites such as in the case of cloud computing.

In the same or different implementations, the communiqué intercepting operation 302 may include an operation 411 for intercepting the communiqué via one or more communication networks. For instance, the network device 10 of FIG. 1b intercepting the communiqué 52 via one or more communication networks 40 (e.g., one or more of a WLAN, a WMAN, a WiMAX, a PTSN, a cellular network, a Client/Server Network, a VPN, and/or other types of networks).

Figure 4B:
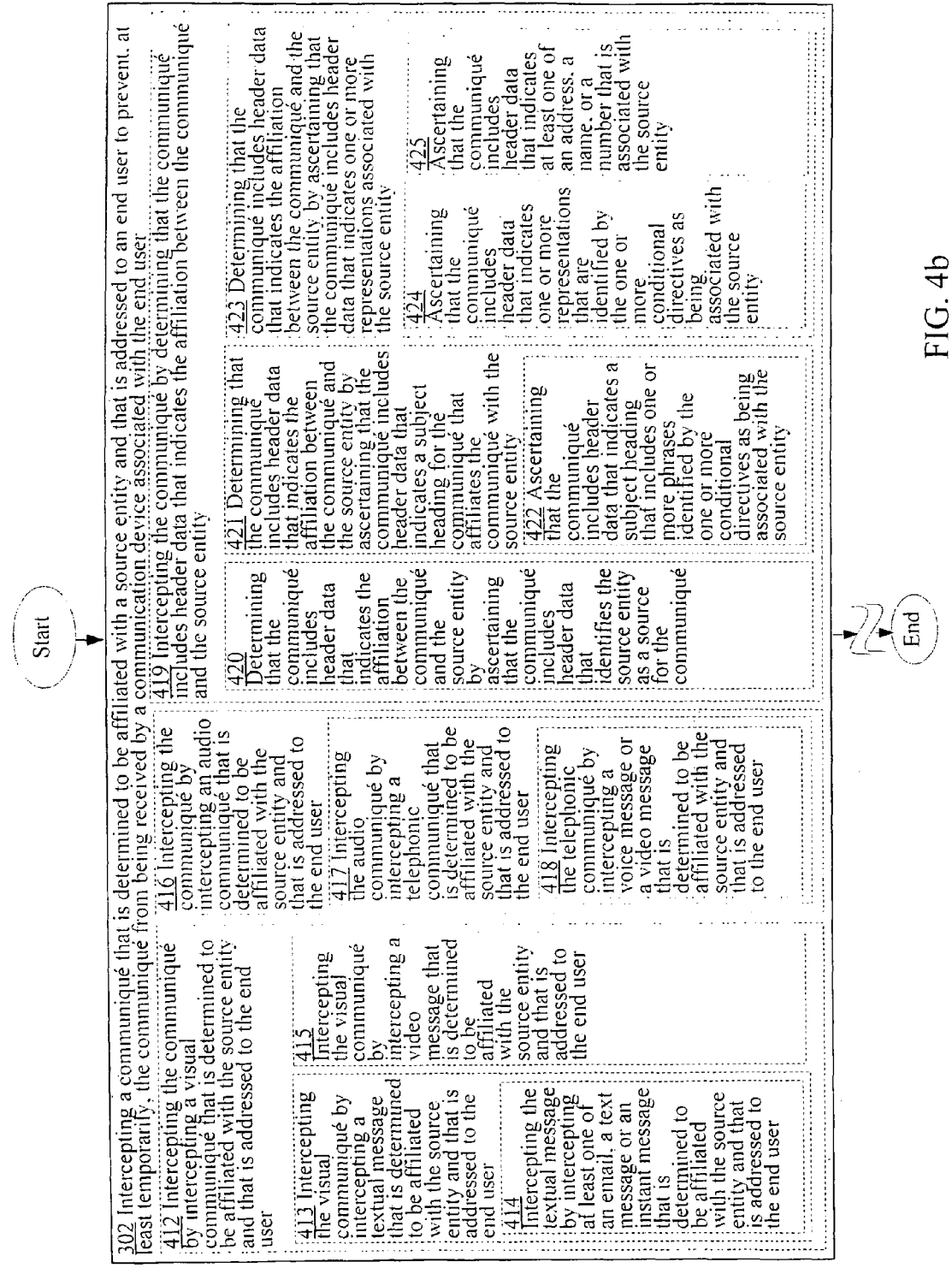
FIG. 4b is a high-level logic flowchart of a process depicting alternate implementations of the communiqué intercepting operation 302 of FIG. 3.

Various types of communiqué may be intercepted by communiqué intercepting operation 302 of FIG. 3 in various alternative implementations. For example, and as illustrated in FIG. 4b, the communiqué intercepting operation 302 of FIG. 3 may include, in some implementations, an operation 412 for intercepting the communiqué by intercepting a visual communiqué that is determined to be affiliated with the source entity and that is addressed to the end user. For instance, the communiqué intercepting module 102 including the visual communiqué intercepting module 202 (see FIG. 2a) of the network device 10 of FIG. 1b intercepting the communiqué 52 (e.g., communiqué 52) by having the visual communiqué intercepting module 202 intercept a visual communiqué (e.g., a message that can be visually displayed such as a textual-type message including an email or instant message, or a video call or message) that is determined to be affiliated with the source entity 20 and that is addressed to the end user 32.

As further illustrated in FIG. 4b, operation 412 may include one or more additional operations in various alternative implementations. For example, in some implementations, operation 412 may include an operation 413 for intercepting the visual communiqué by intercepting a textual message that is determined to be affiliated with the source entity and that is addressed to the end user as further depicted in FIG. 4b. For instance, the visual communiqué intercepting module 202 including the textual message intercepting module 203 (see FIG. 2a) of the network device 10 of FIG. 1b intercepting the visual communiqué (e.g., communiqué 52) by having the textual message intercepting module 203 intercept a textual message (e.g., email, instant message or IM, text message, or other types of textual message) that is determined to be affiliated with the source entity 20 and that is addressed to the end user 32.

As further illustrated in FIG. 4b, operation 413 may, in turn, further include an operation 414 for intercepting the textual message by intercepting at least one of an email, a text message or an instant message that is determined to be affiliated with the source entity and that is addressed to the end user. For instance, the textual message intercepting module 203 of the network device 10 of FIG. 1b intercepting the textual message (e.g., communiqué 52) by intercepting at least one of an email, a text message or an instant message (IM) that is determined to be affiliated with the source entity 20 and that is addressed to the end user 32.

In some cases, and as further illustrated in FIG. 4b, the operation 412 for intercepting the communiqué by intercepting a visual communiqué that is determined to be affiliated with the source entity and that is addressed to the end user may include an operation 415 for intercepting the visual communiqué by intercepting a video message that is determined to be affiliated with the source entity and that is addressed to the end user. For instance, the visual communiqué intercepting module 202 including the video message intercepting module 204 (see FIG. 2a) of the network device 10 of FIG. 1b intercepting the visual communiqué (e.g., communiqué 52) by having the video message intercepting module 204 intercept a video message (e.g., video call) that is determined to be affiliated with the source entity 20 and that is addressed to the end user 32.

In various implementations, the communiqué intercepting operation 302 of FIG. 3 may include an operation 416 for intercepting the communiqué by intercepting an audio communiqué that is determined to be affiliated with the source entity and that is addressed to the end user as further depicted in FIG. 4b. For instance, the communiqué intercepting module 102 including the audio communiqué intercepting module 205 (see FIG. 2a) of the network device 10 of FIG. 1b intercepting the communiqué 52 by intercepting an audio communiqué (e.g., a voice message) that is determined to be affiliated with the source entity 20 and that is addressed to the end user 32.

As further illustrated in FIG. 4b, operation 416 may, in turn, include an operation 417 for intercepting the audio communiqué by intercepting a telephonic communiqué that is determined to be affiliated with the source entity and that is addressed to the end user in various implementations. For instance, the audio communiqué intercepting module 205 including the telephonic communiqué intercepting module 206 (see FIG. 2a) of the network device 10 of FIG. 1b intercepting the audio communiqué (e.g., communiqué 52) by having the telephonic communiqué intercepting module 206 intercept a telephonic communiqué that is determined to be affiliated with the source entity 20 and that is addressed to the end user 32.

In some cases, operation 417 may further include an operation 418 for intercepting the telephonic communiqué by intercepting a voice message or a video message that is determined to be affiliated with the source entity and that is addressed to the end user. For instance, the telephonic communiqué intercepting module 206 including the voice message intercepting module 207 or the video message intercepting module 208 (see FIG. 2a) of the network device 10 of FIG. 1b intercepting the telephonic communiqué by having the voice message intercepting module 207 intercepting a voice message or having the video message intercepting module 208 intercept a video message that is determined to be affiliated with the source entity 20 and that is addressed to the end user 32.

Various approaches may be employed in order to determine whether the communiqué 52 is affiliated with the source entity 20 in the communiqué intercepting operation 302 of FIG. 3. For example, in various implementations, the communiqué intercepting operation 302 of FIG. 3 may include an operation 419 for intercepting the communiqué by determining that the communiqué includes header data that indicates the affiliation between the communiqué and the source entity as further depicted in FIG. 4b. For instance, the communiqué intercepting module 102 including the header data source entity affiliation determining module 210 (see FIG. 2b) of the network device 10 of FIG. 1b intercepting the communiqué 52 when the header data source entity affiliation determining module 210 determines that the communiqué 52 includes header data that indicates the affiliation between the communiqué 52 and the source entity 20.

As further illustrated in FIG. 4b, operation 419 may include one or more additional operations in various alternative implementations. For example, in some cases, operation 419 may further include an operation 420 for determining that the communiqué includes header data that indicates the affiliation between the communiqué and the source entity by ascertaining that the communiqué includes header data that identifies the source entity as a source for the communiqué. For instance, the header data source entity affiliation determining module 210 including the source entity source ascertaining module 211 (see FIG. 2b) of the network device 10 of FIG. 1b determining that the communiqué 52 includes header data that indicates the affiliation between the communiqué 52 and the source entity 20 when the source entity source ascertaining module 211 ascertains that the communiqué 52 includes header data that identifies the source entity 20 as a source for the communiqué 52. For example, if the communiqué 52 is a telephone message, than the source entity source ascertaining module 211 ascertaining as to whether the communiqué 52 includes header data that indicates a telephone number associated with the source entity 20 as the source for the telephone call.

In the same or different implementations, operation 419 may include an operation 421 for determining that the communiqué includes header data that indicates the affiliation between the communiqué and the source entity by ascertaining that the communiqué includes header data that indicates a subject heading for the communiqué that affiliates the communiqué with the source entity. For instance, the header data source entity affiliation determining module 210 including the affiliated subject heading ascertaining module 212 (see FIG. 2a) of the network device 10 of FIG. 1b determining that the communiqué 52 includes header data that indicates the affiliation between the communiqué 52 and the source entity 20 when the affiliated subject heading ascertaining module 212 ascertains that the communiqué 52 (e.g., an email) includes header data that indicates a subject heading for the communiqué 52 that affiliates the communiqué 52 with the source entity 20 (e.g., the subject heading that includes a name, a word, and/or a phrase associated with the source entity 20).

As further illustrated in FIG. 4b, operation 421 may further include an operation 422 for ascertaining that the communiqué includes header data that indicates a subject heading that includes one or more phrases identified by the one or more conditional directives as being associated with the source entity. For instance, the affiliated subject heading ascertaining module 212 of the network device 10 of FIG. 1b ascertaining that the communiqué 52 (e.g., email) includes header data that indicates a subject heading that includes one or more phrases (e.g., a motto for a business or favorite phrase of a source user 22) identified by the one or more conditional directives 50 as being associated with the source entity 20.

In the same or different implementations, operation 419 may alternatively or additionally include an operation 423 for determining that the communiqué includes header data that indicates the affiliation between the communiqué and the source entity by ascertaining that the communiqué includes header data that indicates one or more representations associated with the source entity. For instance, the header data source entity affiliation determining module 210 including the source entity representation ascertaining module 213 (see FIG. 2a) of the network device 10 of FIG. 1b determining that the communiqué includes header data that indicates the affiliation between the communiqué 52 and the source entity 20 when the source entity representation ascertaining module 213 ascertains that the communiqué 52 includes header data that indicates one or more representations (e.g., name, email address, IP address, URL, telephone number, and/or other identifiers) associated with the source entity 20.

As further illustrated in FIG. 4b, operation 423 may include an operation 424 for ascertaining that the communiqué includes header data that indicates one or more representations that are identified by the one or more conditional directives as being associated with the source entity. For instance the source entity representation ascertaining module 213 of the network device 10 of FIG. 1b ascertaining that the communiqué 52 includes header data that indicates one or more representations (e.g., name, email address, IP address, URL, telephone number, and/or other identifiers) that are identified by the one or more conditional directives 50 (e.g., as directly or indirectly provided by the end user 32) as being associated with the source entity 20.

In the same or alternative implementations, operation 423 may include an operation 425 for ascertaining that the communiqué includes header data that indicates at least one of an address, a name, or a number that is associated with the source entity. For instance the source entity representation ascertaining module 213 of the network device 10 of FIG. 1b ascertaining that the communiqué includes header data that indicates at least one of an address (e.g., an email address, an IP address, or a URL), a name (e.g., a username, a legal name, or a business name), or a number (e.g., telephone number) that is associated with the source entity 20.

In addition to or alternative to checking header data, message content data may be examined in order to determine whether a communiqué 52 (or communiqué 53) is affiliated a source entity 20. For example, and as further illustrated in FIG. 4c, in various implementations, the communiqué intercepting operation 302 of FIG. 3 may include an operation 426 for intercepting the communiqué by determining that the communiqué includes message content data that indicates the affiliation between the communiqué and the source entity. For instance, the communiqué intercepting module 102 including the message content data source entity affiliation determining module 214 (see FIG. 2a) of the network device 10 of FIG. 1b intercepting the communiqué when the message content data source entity affiliation determining module 214 determines that the communiqué 52 includes message content data (e.g., audio data, image data, and/or alphanumeric or textual data) that indicates the affiliation between the communiqué 52 and the source entity 20.

Figure 4C:
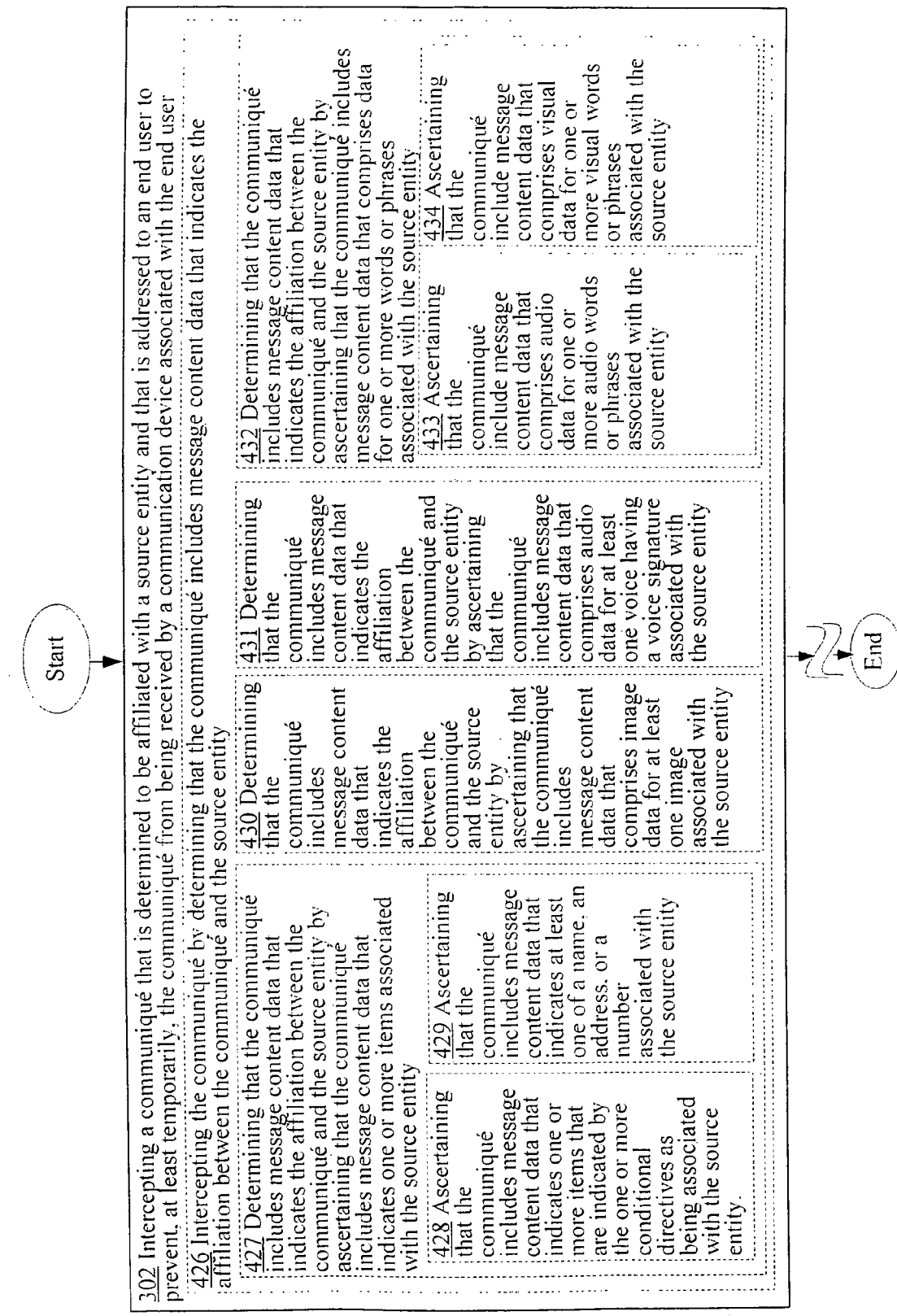
FIG. 4c is a high-level logic flowchart of a process depicting alternate implementations of the communiqué intercepting operation 302 of FIG. 3.

As further illustrated in FIG. 4c, operation 426 may include one or more additional operations in various alternative implementations. For example, in some implementations operation 426 may include an operation 427 for determining that the communiqué includes message content data that indicates the affiliation between the communiqué and the source entity by ascertaining that the communiqué includes message content data that indicates one or more items associated with the source entity. For instance, the message content data source entity affiliation determining module 214 including the message content data associated item ascertaining module 215 (see FIG. 2a) of the network device 10 of FIG. 1b determining that the communiqué 52 includes message content data that indicates the affiliation between the communiqué 52 and the source entity 20 when the message content data associated item ascertaining module 215 ascertains that the communiqué 52 includes message content data that indicates one or more items associated with the source entity 20.

In some implementations, operation 427 may, in turn, include an operation 428 for ascertaining that the communiqué includes message content data that indicates one or more items that are indicated by the one or more conditional directives as being associated with the source entity. For instance, the message content data associated item ascertaining module 215 of the network device 10 of FIG. 1b ascertaining that the communiqué 52 includes message content data that indicates one or more items that are indicated by the one or more conditional directives 50 (e.g., as directly or indirectly provided by an end user 32) as being associated with the source entity 20.

In the same or different implementations, operation 427 may include an operation 429 for ascertaining that the communiqué includes message content data that indicates at least one of a name, an address, or a number associated with the source entity. For instance, the message content data associated item ascertaining module 215 of the network device 10 of FIG. 1b ascertaining that the communiqué 52 includes message content data that indicates at least one of a name (e.g., a username, a legal name, a website name, or a business name), an address (e.g., an email address, an IP address, or a URL), or a number (e.g., a telephone number) associated with the source entity 20.

As further illustrated in FIG. 4c, in various implementations, operation 426 for intercepting the communiqué by determining that the communiqué includes message content data that indicates the affiliation between the communiqué and the source entity may include an operation 430 for determining that the communiqué includes message content data that indicates the affiliation between the communiqué and the source entity by ascertaining that the communiqué includes message content data that comprises image data for at least one image associated with the source entity. For instance, the message content data source entity affiliation determining module 214 including the message content data associated item ascertaining module 215 of the network device 10 of FIG. 1b determining that the communiqué 52 includes message content data that indicates the affiliation between the communiqué 52 and the source entity 20 when the message content data associated item ascertaining module 215 ascertains that the communiqué 52 includes message content data that comprises image data for at least one image (e.g., digital image or video image) associated with the source entity 20.

In the same or different implementations, operation 426 may include an operation 431 for determining that the communiqué includes message content data that indicates the affiliation between the communiqué and the source entity by ascertaining that the communiqué includes message content data that comprises audio data for at least one voice having a voice signature associated with the source entity. For instance, the message content data source entity affiliation determining module 214 including the message content data associated item ascertaining module 215 of the network device 10 of FIG. 1b determining that the communiqué 52 includes message content data that indicates the affiliation between the communiqué 52 and the source entity 20 when the message content data associated item ascertaining module 215 ascertains that the communiqué 52 (e.g., voice message) includes message content data that comprises audio data for at least one voice having a voice signature associated with the source entity 20 (e.g., source user 22).

In the same or different implementations, operation 426 may include an operation 432 for determining that the communiqué includes message content data that indicates the affiliation between the communiqué and the source entity by ascertaining that the communiqué includes message content data that comprises data for one or more words or phrases associated with the source entity. For instance, the message content data source entity affiliation determining module 214 including the message content data associated item ascertaining module 215 of the network device 10 of FIG. 1b determining that the communiqué 52 includes message content data that indicates the affiliation between the communiqué 52 and the source entity 20 when the message content data associated item ascertaining module 215 ascertains that the communiqué 52 includes message content data that comprises data for one or more words or phrases (e.g., a name or a motto) associated with the source entity 20.

In some cases, operation 432 may, in turn, include an operation 433 for ascertaining that the communiqué includes message content data that comprises audio data for one or more audio words or phrases associated with the source entity. For instance, the message content data associated item ascertaining module 215 of the network device 10 of FIG. 1b ascertaining that the communiqué 52 (e.g., video message) includes message content data that comprises audio (e.g., voice) data for one or more audio words or phrases (e.g., name or motto) associated with the source entity 20.

In the same or different implementations, operation 432 may include an operation 434 for ascertaining that the communiqué includes message content data that comprises visual data for one or more visual words or phrases associated with the source entity. For instance, the message content data associated item ascertaining module 215 of the network device 10 of FIG. 1b ascertaining that the communiqué 52 includes message content data that comprises visual (e.g., textual) data for one or more visual words or phrases associated with the source entity 20.

Figure 4D:
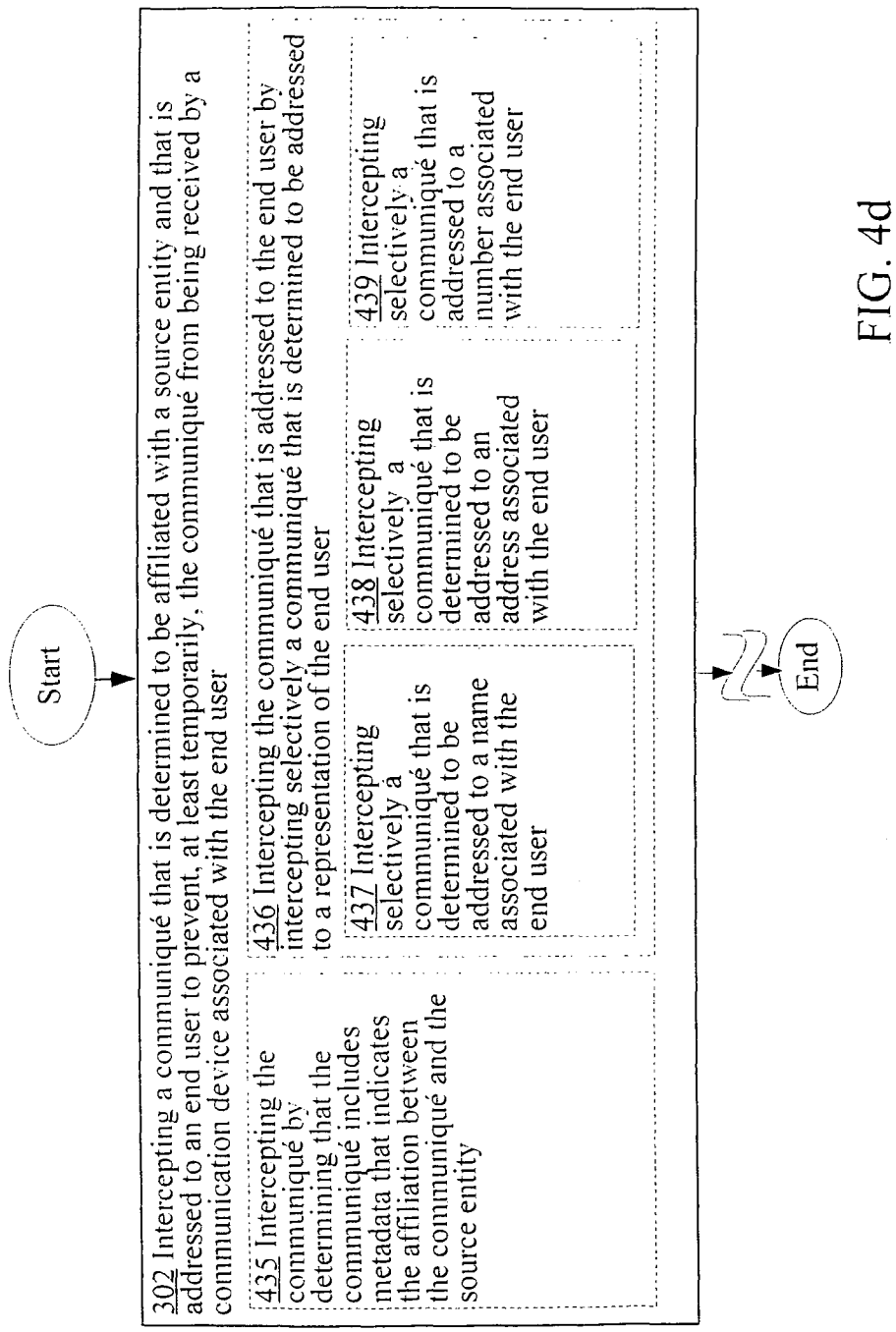
FIG. 4d is a high-level logic flowchart of a process depicting alternate implementations of the communiqué intercepting operation 302 of FIG. 3.

In addition to or alternative to examining header data and/or message content data, metadata may alternatively or additionally be examined in some implementations in order to determine whether a communiqué 52 (or communiqué 53 in FIGS. 1a and 1b) is affiliated with a particular source entity 20. For example, in various implementations, the communiqué intercepting operation 302 of FIG. 3 may include an operation 435 for intercepting the communiqué by determining that the communiqué includes metadata that indicates the affiliation between the communiqué and the source entity as depicted in FIG. 4d. For instance, the communiqué intercepting module 102 including the metadata source entity affiliation determining module 216 (see FIG. 2a) of the network device 10 of FIG. 1b intercepting the communiqué 52 when the metadata source entity affiliation determining module 216 determines that the communiqué 52 includes metadata that indicates the affiliation between the communiqué 52 and the source entity 20.

In various implementations, the communiqué intercepting operation 302 of FIG. 3 may include an operation 436 for intercepting the communiqué that is addressed to the end user by intercepting selectively a communiqué that is determined to be addressed to a representation of the end user as illustrated in FIG. 4d. For instance, the communiqué intercepting module 102 of the network device 10 of FIG. 1b intercepting the communiqué 52 that is addressed to the end user 32 by selectively intercepting a communiqué 52 that is determined to be addressed (e.g., transmitted to or being sent to) to a representation (e.g., a name, an address such as an email address or an IP address, or a number such as a telephone number) of the end user 32.

As further illustrated in FIG. 4d, operation 436 may be implemented in a number of different ways in various alternative implementations. For example, in some implementations, operation 436 may include an operation 437 for intercepting selectively a communiqué that is determined to be addressed to a name associated with the end user. For instance, the communiqué intercepting module 102 of the network device 10 of FIG. 1b selectively intercepting a communiqué 52 that is determined to be addressed to a name (e.g., a username) associated with the end user 32.

In some implementations, operation 436 may include an operation 438 for intercepting selectively a communiqué that is determined to be addressed to an address associated with the end user. For instance, the communiquéselectively intercepting module 102 of the network device 10 of FIG. 1b selectively intercepting a communiqué 52 that is determined to be addressed to an address (e.g., an email address, an IP address, or a URL) associated with the end user 32.

In some implementations, operation 436 may include an operation 439 for intercepting selectively a communiqué that is addressed to a number associated with the end user. For instance, the communiqué intercepting module 102 of the network device 10 of FIG. 1b selectively intercepting a communiqué 52 that is addressed to a number (e.g., telephone number) associated with the end user 32.

Figure 5A:
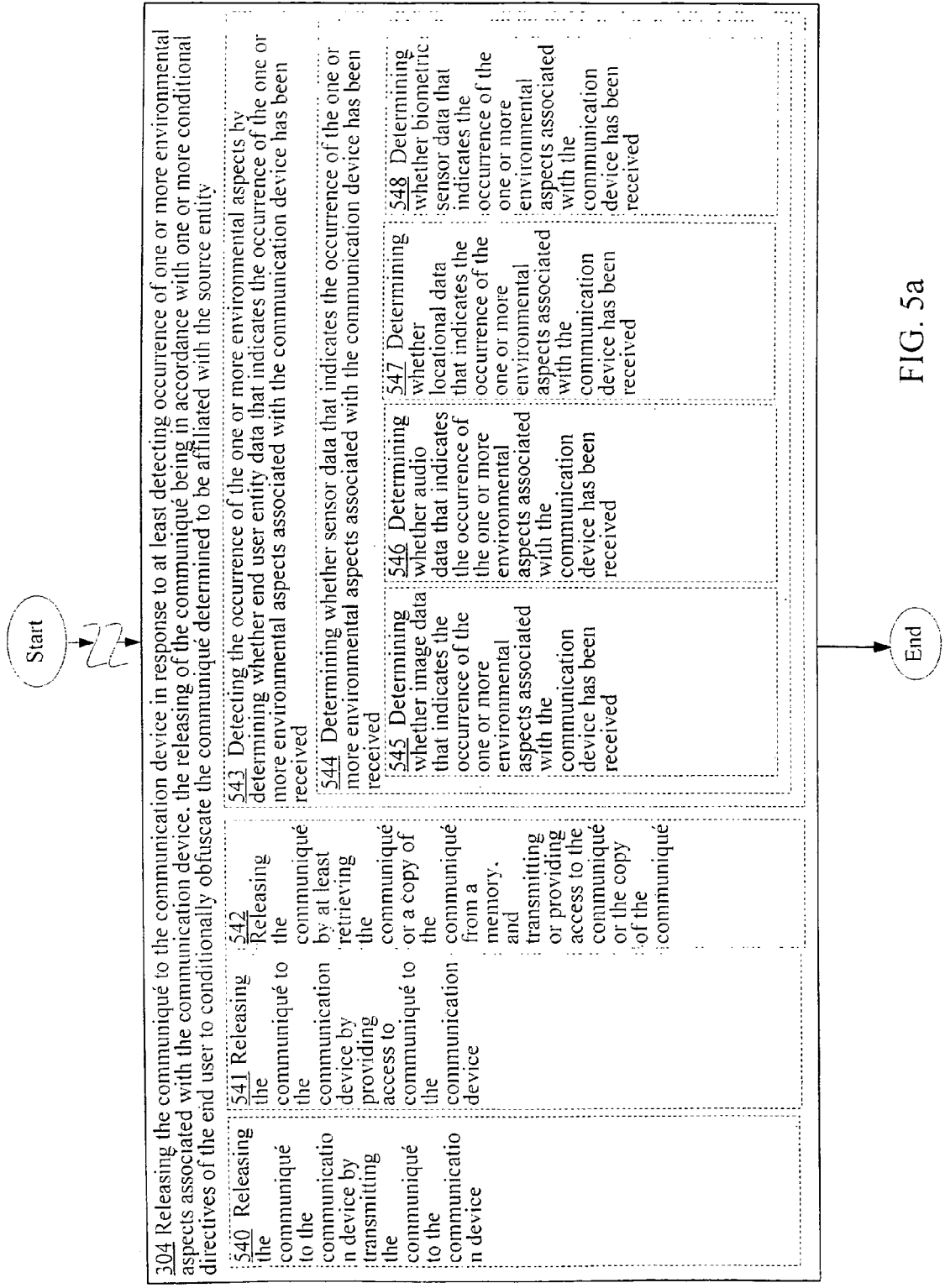
FIG. 5a is a high-level logic flowchart of a process depicting alternate implementations of the communiqué releasing operation 304 of FIG. 3.

Referring back to the communiqué releasing operation 304 of FIG. 3, the communiqué releasing operation 304 similar to the communiqué intercepting operation 302 of FIG. 3 may be executed in a number of different ways in various alternative implementations as illustrated in FIGS. 5a, 5b, 5c, 5d, 5e, 5f, and 5g. For example, the communiqué 52 that may be released through the communiqué releasing operation 304 of FIG. 3 may be released in a variety of different ways in various alternative implementations. In some implementations, for example, the communiqué releasing operation 304 of FIG. 3 may include an operation 540 for releasing the communiqué to the communication device by transmitting the communiqué to the communication device as illustrated in FIG. 5a. For instance, the communiqué releasing module 104 including the communiqué transmitting module 218 (see FIG. 2b) of the network device 10 of FIG. 1b releasing the communiqué 52 to the communication device 34 (e.g., a cellular telephone, a Smartphone, a laptop or desktop, a PDA, and so forth) by having the communiqué transmitting module 218 transmit the communiqué 52 to the communication device 34.

In some alternative implementations, the communiqué releasing operation 304 of FIG. 3 may include an operation 541 for releasing the communiqué to the communication device by providing access to communiqué to the communication device. For instance, the communiqué releasing module 104 including the communiqué access providing module 219 (see FIG. 2*b*) of the network device 10 of FIG. 1*b* releasing the communiqué 52 to the communication device 34 by having the communiqué access providing module 219 provide access to communiqué 52 to the communication device 34.

In the same or different implementations, the communiqué releasing operation 304 of FIG. 3 may include an operation 542 for releasing the communiqué by at least retrieving the communiqué or a copy of the communiqué from a memory, and transmitting or providing access to the communiqué or the copy of the communiqué. For instance, the communiqué releasing module 104 including the communiqué retrieving module 220 (see FIG. 2*b*) of the network device 10 of FIG. 1*b* releasing the communiqué 52 by having the communiqué retrieving module 220 at least retrieve the communiqué 52 or a copy of the communiqué 52 from a memory 140, and having the communiqué transmitting module 218 transmit the communiqué 52 or the copy of the communiqué 52, or having the communiqué access providing module 219 provide access to the communiqué 52 or the copy of the communiqué 52.

In various implementations, the communiqué releasing operation 304 of FIG. 3 may include an operation 543 for detecting the occurrence of the one or more environmental aspects by determining whether end user entity data that indicates the occurrence of the one or more environmental aspects associated with the communication device has been received. For instance, the environmental aspect occurrence detecting module 222 including the end user entity data reception determining module 224 (see FIG. 2*b*) of the network device 10 of FIG. 1*b* detecting the occurrence of the one or more environmental aspects by having the end user entity data reception determining module 224 determine whether end user entity data 55 (e.g., as provided by the communication device 34 and/or by sensors 36) that indicates the occurrence of the one or more environmental aspects associated with the communication device 34 has been received by the network device 10.

As further illustrated in FIG. 5*a*, operation 543 may, in turn, include an operation 544 for determining whether sensor data that indicates the occurrence of the one or more environmental aspects associated with the communication device has been received. For instance, the environmental aspect indicating sensor data reception determining module 226 (see FIG. 2*b*) of the network device 10 of FIG. 1*b* determining whether sensor data (e.g., as at least originally provided by one or more sensors 36 such as a digital camera, a webcam, and/or a microphone) that indicates the occurrence of the one or more environmental aspects associated with the communication device 34 has been received.

As also further illustrated in FIG. 5*a*, operation 544 may include one or more additional operations in various alternative implementations. For example, in some implementations, operation 544 may include an operation 545 for determining whether image data that indicates the occurrence of the one or more environmental aspects associated with the communication device has been received. For instance, the environmental aspect, indicating sensor data reception determining module 226 of the network device 10 of FIG. 1*b* determining whether image data (e.g., digital image, video image, etc.) that indicates the occurrence of the one or more environmental aspects (e.g., presence or absence of a third party within the proximate vicinity of the communication device 34) associated with the communication device 34 has been received.

In the same or different implementations, operation 544 may include an operation 546 for determining whether audio data that indicates the occurrence of the one or more environmental aspects associated with the communication device has been received. For instance, the environmental aspect indicating sensor data reception determining module 226 of the network device 10 of FIG. 1*b* determining whether audio data (e.g., voice data) that indicates the occurrence of the one or more environmental aspects associated with the communication device 34 has been received. For example, determining whether audio data of a voice having a particular voice signature that is associated with the source entity 20 (e.g., source user 22) has been received.

In the same or different implementations, operation 544 may include an operation 547 for determining whether locational data that indicates the occurrence of the one or more environmental aspects associated with the communication device has been received. For instance, the environmental aspect indicating sensor data reception determining module 226 of the network device 10 of FIG. 1*b* determining whether locational data (e.g., GPS data) that indicates the occurrence of the one or more environmental aspects associated with the communication device 34 (e.g., the communication device 34 being at one or more particular locations such as at an end user's home location) has been received.

In the same or different implementations, operation 544 may include an operation 548 for determining whether biometric sensor data that indicates the occurrence of the one or more environmental aspects associated with the communication device has been received. For instance, the environmental aspect indicating sensor data reception determining module 226 of the network device 10 of FIG. 1*b* determining whether biometric sensor data (e.g., data for a retinal scan or image or audio data that indicates the presence or absence of a third party within the proximate vicinity of the communication device 34) that indicates the occurrence of the one or more environmental aspects associated with the communication device 34 has been received.

Figure 5B:
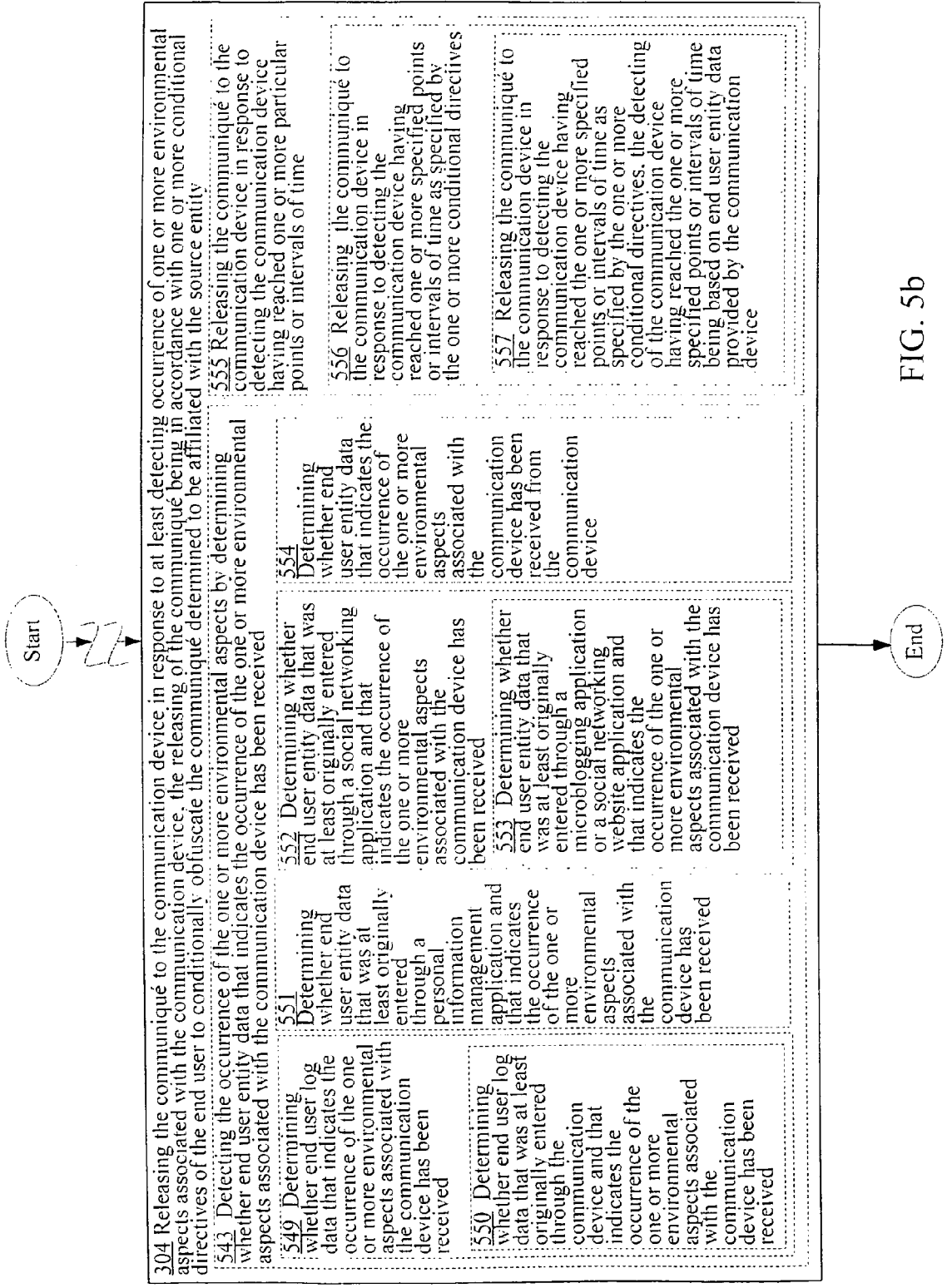
FIG. 5b is a high-level logic flowchart of a process depicting alternate implementations of the communiqué releasing operation 304 of FIG. 3.

In various implementations, operation 543 for detecting the occurrence of the one or more environmental aspects by determining whether end user entity data that indicates the occurrence of the one or more environmental aspects associated with the communication device has been received may include an operation 549 for determining whether end user log data that indicates the occurrence of the one or more environmental aspects associated with the communication device has been received as illustrated in FIG. 5*b*. For instance, the environmental aspect indicating end user log data reception determining module 228 (see FIG. 2*b*) of the network device 10 of FIG. 1*b* determining whether end user log data (e.g., data of log entries entered by an end user 32 including, for example, entries made through a microblog application or other social networking applications, or entries entered through a personal information management application) that indicates the occurrence of the one or more environmental aspects associated with the communication device 34 has been received.

As further illustrated in FIG. 5*b*, in some implementations, operation 549 may further include an operation 550 for determining whether end user log data that was at least originally entered through the communication device and that indicates the occurrence of the one or more environmental aspects associated with the communication device has been received. For instance, the environmental aspect indicating end user log data reception determining module 228 of the network device 10 of FIG. 1b determining whether end user log data that was at least originally entered through the communication device 34 (e.g., entered using for example, an application for a social networking website, or entered using a personal information management application) and that indicates the occurrence of the one or more environmental aspects associated with the communication device 34 has been received.

In the same or different implementations, operation 543 may include an operation 551 for determining whether end user entity data that was at least originally entered through a personal information management application and that indicates the occurrence of the one or more environmental aspects associated with the communication device has been received as further depicted in FIG. 5b. For instance, the end user entity data reception determining module 224 (see FIG. 2b) of the network device 10 of FIG. 1b determining whether end user entity data 55 (e.g., in the form of log entries that was at least originally entered through a personal information management application (e.g., Microsoft Outlook) and that indicates the occurrence of the one or more environmental aspects associated with the communication device 34 has been received.

In the same or different implementations, operation 543 may additionally or alternatively include an operation 552 for determining whether end user entity data that was at least originally entered through a social networking application and that indicates the occurrence of the one or more environmental aspects associated with the communication device has been received. For instance, the end user entity data reception determining module 224 of the network device 10 of FIG. 1b determining whether end user entity data 55 that was at least originally entered through a social networking application (e.g., a microblogging application, social networking website application, and so forth) and that indicates the occurrence of the one or more environmental aspects associated with the communication device 34 has been received.

As further illustrated in FIG. 5b, in some implementations, operation 552 may further include an operation 553 for determining whether end user entity data that was at least originally entered through a microblogging application or a social networking website application and that indicates the occurrence of the one or more environmental aspects associated with the communication device has been received as depicted in FIG. 5b. For instance, the end user entity data reception determining module 224 of the network device 10 of FIG. 1b determining whether end user entity data 55 that was at least originally entered through a microblogging application or a social networking website application and that indicates the occurrence of the one or more environmental aspects associated with the communication device 34 has been received.

In the same or different implementations, operation 543 may include an operation 554 for determining whether end user entity data that indicates the occurrence of the one or more environmental aspects associated with the communication device has been received from the communication device. For instance, the end user entity data reception determining module 224 of the network device 10 of FIG. 1b determining whether end user entity data 55 that indicates the occurrence of the one or more environmental aspects associated with the communication device 34 has been received from the communication device 34.

As alluded to earlier, the one or more "environmental aspects," the detection of which may be the basis for releasing the communiqué 52 to the communication device 34 in the communiqué releasing operation 304 of FIG. 3, may be in reference to one or more contextual aspects of the environment that the communication device exists in. In some cases, these "environmental aspects" may be indicative of whether a communiqué 52 that is determined to be affiliated with a particular source entity 20 can be safely transmitted to the communication device 34 without being shown or exposed to one or more third parties.

For example, one type of environmental aspect that when detected may cause the release of the communiqué 52 (e.g., during the communiqué releasing operation 304 of FIG. 3) may be related to the time or temporal aspect of the communication device 34 and its surrounding environment. For example, in some implementations, the communiqué releasing operation 304 of FIG. 3 may include an operation 555 for releasing the communiqué to the communication device in response to detecting the communication device having reached one or more particular points or intervals of time as further depicted in FIG. 5b. For instance, the communiqué releasing module 104 including the communication device time detecting module 230 (see FIG. 2b) of the network device 10 of FIG. 1b releasing the communiqué 52 to the communication device 34 in response to the communication device time detecting module 230 detecting the communication device 34 having reached one or more particular points or intervals of time.

As further illustrated in FIG. 5b, operation 555 may further include, in some implementations, an operation 556 for releasing the communiqué to the communication device in response to detecting the communication device having reached one or more specified points or intervals of time as specified by the one or more conditional directives. For instance, the communiqué releasing module 104 including the communication device time detecting module 230 of the network device 10 of FIG. 1b releasing the communiqué 52 to the communication device 34 in response to the communication device time detecting module 230 detecting the communication device 34 having reached one or more specified points or intervals of time (e.g., as indicated by the end user entity data 55) as specified by the one or more conditional directives 50.

In some cases, operation 556 may further include an operation 557 for releasing the communiqué to the communication device in response to detecting the communication device having reached the one or more specified points or intervals of time as specified by the one or more conditional directives, the detecting of the communication device having reached the one or more specified points or intervals of time being based on end user entity data provided by the communication device. For instance, the communiqué releasing module 104 including the communication device time detecting module 230 of the network device 10 of FIG. 1b releasing the communiqué 52 to the communication device 34 in response to the communication device time detecting module 230 detecting the communication device 34 having reached the one or more specified points or intervals of time as specified by the one or more conditional directives 50, the detecting of the communication device 34 having reached the one or more specified points or intervals of time being based on end user entity data 55 provided by the communication device 34.

Figure 5C:
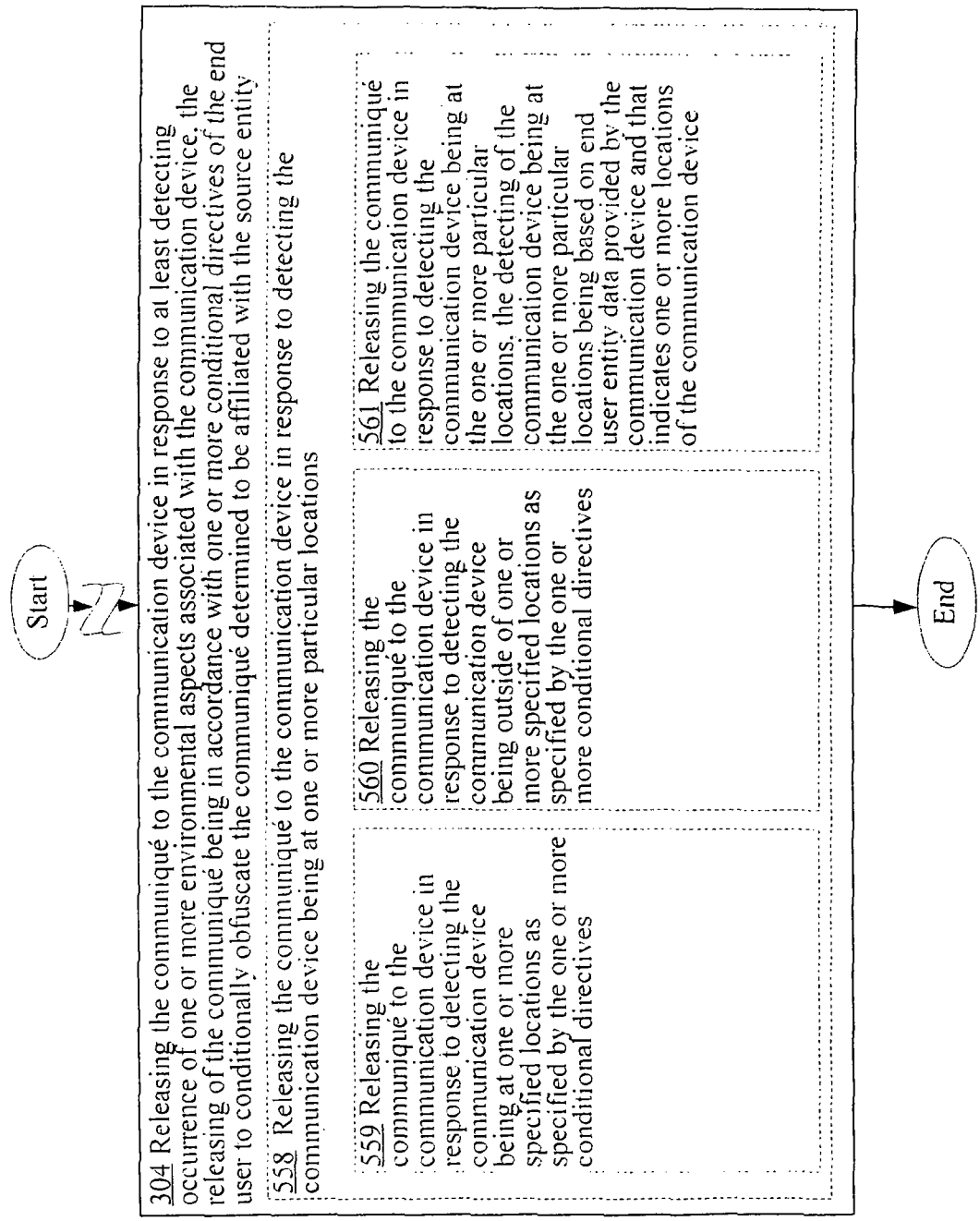
FIG. 5c is a high-level logic flowchart of a process depicting alternate implementations of the communiqué releasing operation 304 of FIG. 3.

Another type of environmental aspect that when detected may cause the release of the communiqué 52 (e.g., during the communiqué releasing operation 304 of FIG. 3) may be related to the "locational" aspect of the communication device 34 with respect to the surrounding environment. For example, in some implementations, the communiqué releasing operation 304 of FIG. 3 may include an operation 558 for releasing the communiqué to the communication device in response to detecting the communication device being at one or more particular locations as illustrated in FIG. 5c. For instance, the communiqué releasing module 104 including the communication device location detecting module 232 (see FIG. 2b) of the network device 10 of FIG. 1b releasing the communiqué 52 to the communication device 34 in response to the communication device location detecting module 232 detecting the communication device 34 being at one or more particular locations (e.g., geographic location).

As further illustrated in FIG. 5c, operation 558 may include one or more additional operations in various alternative implementations. For example, in some implementations, operation 558 may include an operation 559 for releasing the communiqué to the communication device in response to detecting the communication device being at one or more specified locations as specified by the one or more conditional directives. For instance, the communiqué releasing module 104 including the communication device location detecting module 232 of the network device 10 of FIG. 1b releasing the communiqué 52 to the communication device 34 in response to the communication device location detecting module 232 detecting the communication device 34 being at one or more specified locations as specified by the one or more conditional directives 50.

In some implementations, operation 558 may include an operation 560 for releasing the communiqué to the communication device in response to detecting the communication device being outside of one or more specified locations as specified by the one or more conditional directives. For instance, the communiqué releasing module 104 including the communication device location detecting module 232 of the network device 10 of FIG. 1b releasing the communiqué 52 to the communication device 34 in response to the communication device location detecting module 232 detecting the communication device 34 being outside of one or more specified locations as specified by the one or more conditional directives 50.

In some implementations, operation 558 may include an operation 561 for releasing the communiqué to the communication device in response to detecting the communication device being at the one or more particular locations, the detecting of the communication device being at the one or more particular locations being based on end user entity data provided by the communication device and that indicates one or more locations of the communication device. For instance, the communiqué releasing module 104 including the communication device location detecting module 232 of the network device 10 of FIG. 1b releasing the communiqué 52 to the communication device 34 in response to the communication device location detecting module 232 detecting the communication device 34 being at the one or more particular locations, the detecting of the communication device 34 being at the one or more particular locations being based on end user entity data 55 (e.g., GPS data) provided by the communication device 34 and that indicates one or more locations of the communication device 34.

Yet another type of environmental aspect that when detected may cause the release of the communiqué 52 (e.g., during the communiqué releasing operation 304 of FIG. 3) may be related to third party proximity aspect (e.g., whether one or more third parties are in the proximate vicinity of the communication device 34 such that the one or more third parties can hear, see, and/or sense a communiqué 52 being presented through the communication device 34) with respect to the communication device 34. For example, in some implementations, the communiqué releasing operation 304 of FIG. 3 may include an operation 562 for releasing the communiqué to the communication device in response to at least determining that one or more third parties are not within a proximate vicinity of the communication device as further depicted in FIG. 5d. For instance, the communiqué releasing module 104 including the third party proximity determining module 242 (see FIG. 2b) of the network device 10 of FIG. 1b releasing the communiqué 52 to the communication device 34 in response to the third party proximity determining module 242 at least determining that one or more third parties are not within a proximate vicinity (e.g., within three feet, within five feet, within ten feet, or within any other maximum distances from which a third party may hear/see/sense a communiqué 52 being presented through the communication device 34) of the communication device 34.

Figure 5D:
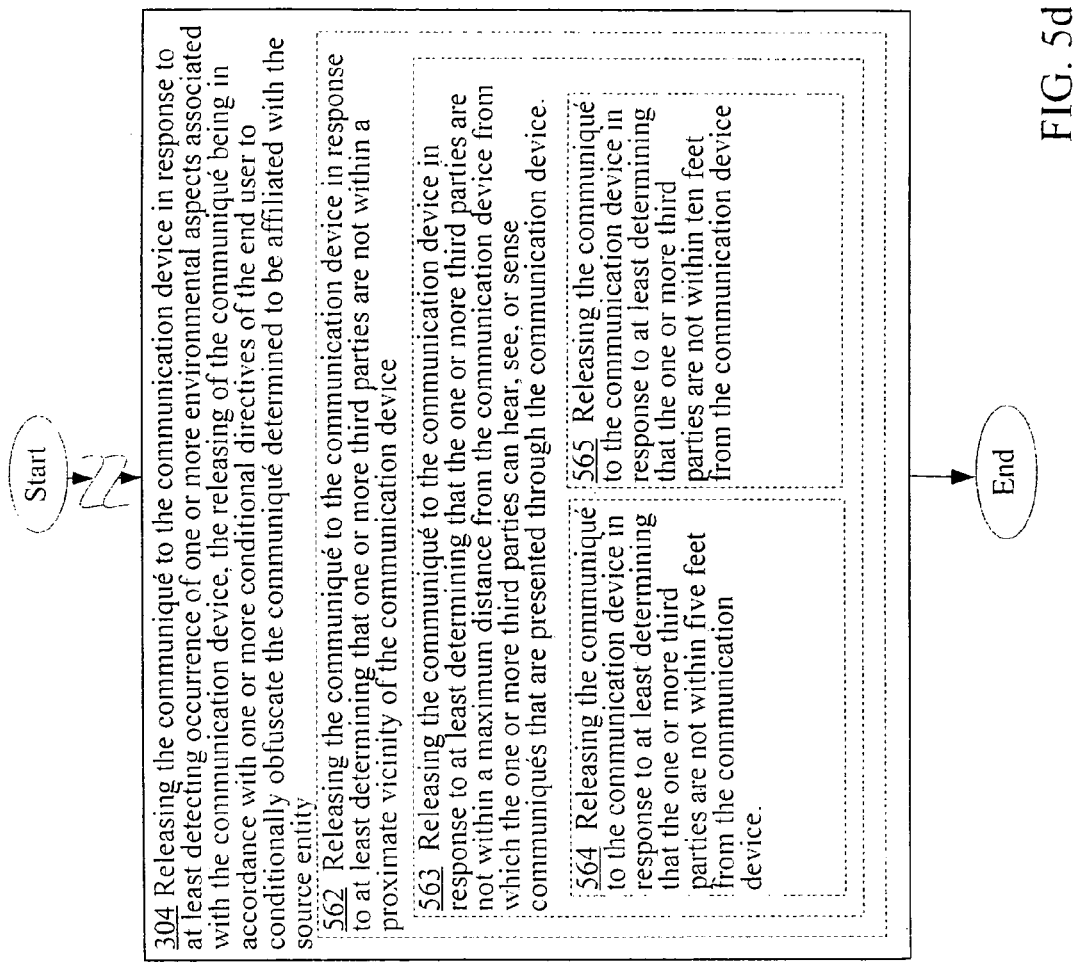
FIG. 5d is a high-level logic flowchart of a process depicting alternate implementations of the communiqué releasing operation 304 of FIG. 3.

As further illustrated in FIG. 5d, in some cases, operation 562 may include an operation 563 for releasing the communiqué to the communication device in response to at least determining that the one or more third parties are not within a maximum distance from the communication device from which the one or more third parties can hear, see, or sense communiqués that are presented through the communication device. For instance, the communiqué releasing module 104 including the third party proximity determining module 242 of the network device 10 of FIG. 1b releasing the communiqué 52 to the communication device 34 in response to the third party proximity determining module 242 at least determining that the one or more third parties are not within a maximum distance from the communication device 34 from which the one or more third parties can (e.g., are able to) hear, see, or sense communiqués 52 that are presented through the communication device 34.

In some implementations, operation 563 may include an operation 564 for releasing the communiqué to the communication device in response to at least determining that the one or more third parties are not within five feet from the communication device. For instance, the communiqué releasing module 104 including the third party proximity determining module 242 of the network device 10 of FIG. 1b releasing the communiqué 52 to the communication device 34 in response to the third party proximity determining module 242 at least determining that the one or more third parties are not within five feet from the communication device 34.

In some implementations, operation 563 may include an operation 565 for releasing the communiqué to the communication device in response to at least determining that the one or more third parties are not within ten feet from the communication device as further depicted in FIG. 5d. For instance, the communiqué releasing module 104 including the third party proximity determining module 242 of the network device 10 of FIG. 1b releasing the communiqué 52 to the communication device 34 in response to the third party proximity determining module 242 at least determining that the one or more third parties are not within ten feet from the communication device 34.

Figure 5E:
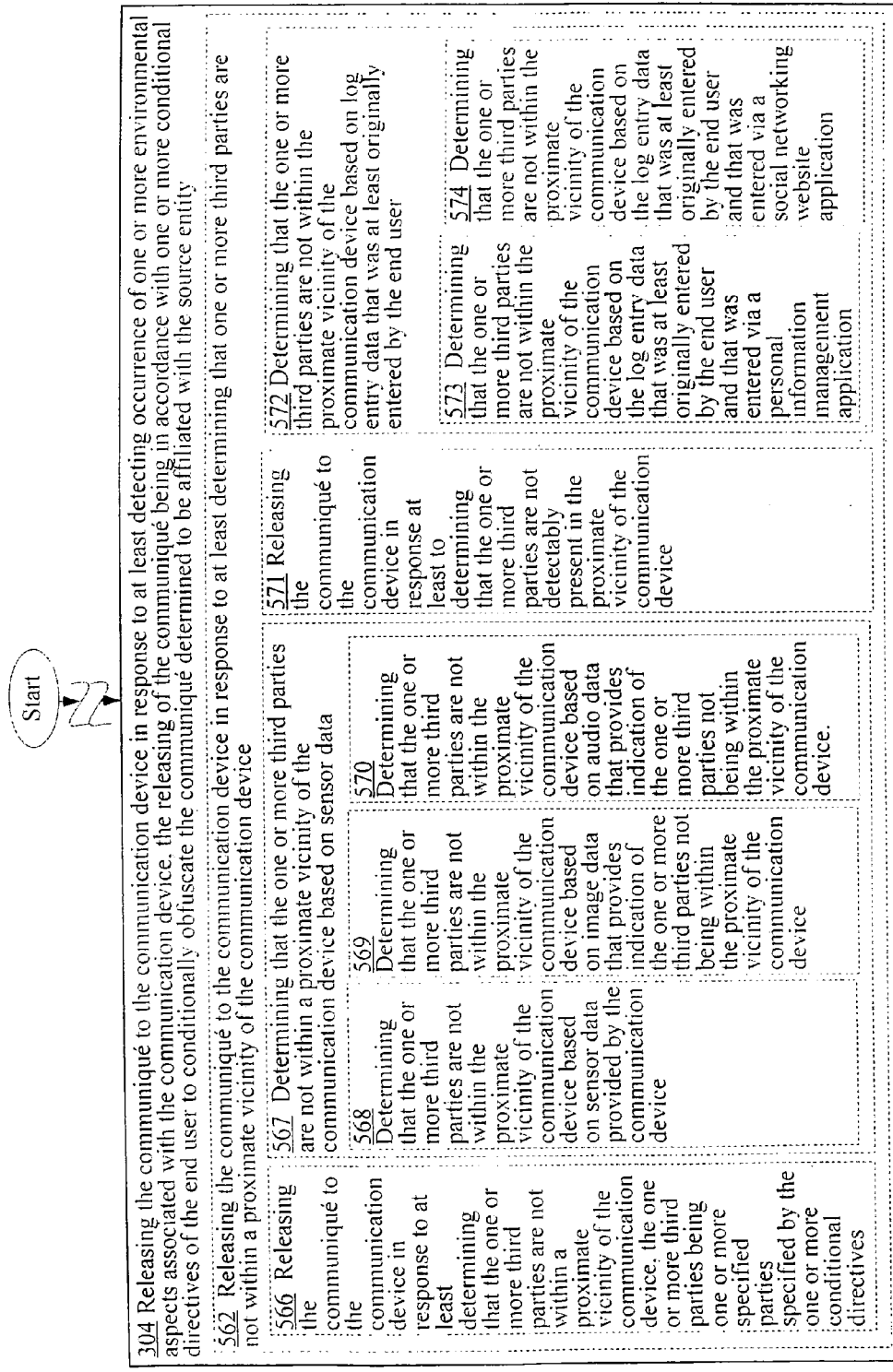
FIG. 5e is a high-level logic flowchart of a process depicting alternate implementations of the communiqué releasing operation 304 of FIG. 3.

Referring to FIG. 5e, in some implementations, the operation 562 for releasing the communiqué to the communication device in response to at least determining that one or more third parties are not within a proximate vicinity of the communication device may include an operation 566 for releasing the communiqué to the communication device in response to at least determining that the one or more third parties are not within a proximate vicinity of the communication device, the one or more third parties being one or more specified parties specified by the one or more conditional directives. For instance, the communiqué releasing module 104 including the third party proximity determining module 242 of the network device 10 of FIG. 1b releasing the communiqué 52 to the communication device 34 in response to the third party proximity determining module 242 at least determining that the one or more third parties are not within a proximate vicinity of the communication device 34, the one or more third parties being one or more specified parties specified by the one or more conditional directives 50.

In the same or different implementations, operation 562 may include an operation 567 for determining that the one or more third parties are not within a proximate vicinity of the communication device based on sensor data. For instance, the sensor data based third party proximity determining module 244 (see FIG. 2b) of the network device 10 of FIG. 1b determining that the one or more third parties are not within a proximate vicinity of the communication device 34 based on sensor data (e.g., in the form of end user entity data 55 received from the communication device 34).

As further illustrated in FIG. 5e, operation 567 may further include one or more additional operations in various alternative implementations. For example, in some implementations, operation 567 may include an operation 568 for determining that the one or more third parties are not within the proximate vicinity of the communication device based on sensor data provided by the communication device. For instance, the sensor data based third party proximity determining module 244 of the network device 10 of FIG. 1b determining that the one or more third parties are not within the proximate vicinity of the communication device 34 based on sensor data (e.g., end user entity data 55) provided by the communication device 34.

In the same or different implementations, operation 567 may include an operation 569 for determining that the one or more third parties are not within the proximate vicinity of the communication device based on image data that provides indication of the one or more third parties not being within the proximate vicinity of the communication device. For instance, the image data based third party proximity determining module 246 (see FIG. 2b) of the network device 10 of FIG. 1b determining that the one or more third parties are not within the proximate vicinity of the communication device 34 based on image data (e.g., in the form of end user entity data 55 provided the communication device 34) that provides indication of the one or more third parties not being within the proximate vicinity of the communication device 34.

In the same or different implementations, operation 567 may include an operation 570 for determining that the one or more third parties are not within the proximate vicinity of the communication device based on audio data that provides indication of the one or more third parties not being within the proximate vicinity of the communication device. For instance, the audio data based third party proximity determining module 248 (see FIG. 2b) of the network device 10 of FIG. 1b determining that the one or more third parties are not within the proximate vicinity of the communication device 34 based on audio data that provides indication of the one or more third parties not being within the proximate vicinity (e.g., the audio data being an audio recording made by the communication device 34 that does not include any voices having voice signatures that matches with voice signatures associated with the one or more third parties) of the communication device 34.

In some implementations, operation 562 may include an operation 571 for releasing the communiqué to the communication device in response at least to determining that the one or more third parties are not detectably present in the proximate vicinity of the communication device as illustrated in FIG. 5e. For instance, the communiqué releasing module 104 including the third party proximity determining module 242 (see FIG. 2b) of the network device 10 of FIG. 1b releasing the communiqué 52 to the communication device 34 in response at least to the third party proximity determining module 242 determining that the one or more third parties are not detectably present (e.g., not detected by one or more sensors as being present) in the proximate vicinity of the communication device 34.

As further illustrated in FIG. 5e, in some cases, operation 562 for releasing the communiqué to the communication device in response to at least determining that one or more third parties are not within a proximate vicinity of the communication device may include an operation 572 for determining that the one or more third parties are not within the proximate vicinity of the communication device based on log entry data that was at least originally entered by the end user as further depicted in FIG. 5e. For instance, the log entry data based third party proximity determining module 250 (see FIG. 2b) of the network device 10 of FIG. 1b determining that the one or more third parties are not within the proximate vicinity of the communication device 34 based on log entry data (e.g., end user entity data 55 as provided by the end user 32 in the example environment 100 of FIG. 1a) that was at least originally entered (e.g. inputted) by the end user 32.

In some implementations, operation 572 may in turn include an operation 573 for determining that the one or more third parties are not within the proximate vicinity of the communication device based on the log entry data that was at least originally entered by the end user and that was entered via a personal information management application. For instance, the log entry data based third party proximity determining module 250 of the network device 10 of FIG. 1b determining that the one or more third parties are not within (e.g., are outside) the proximate vicinity of the communication device 34 based on the log entry data that was at least originally entered (e.g., inputted) by the end user 32 and that was entered via a personal information management application (e.g., Microsoft Outlook).

In the same or different implementations, operation 572 may include an operation 574 for determining that the one or more third parties are not within the proximate vicinity of the communication device based on the log entry data that was at least originally entered by the end user and that was entered via a social networking website application. For instance, the log entry data based third party proximity determining module 250 of the network device 10 of FIG. 1b determining that the one or more third parties are not within the proximate vicinity of the communication device 34 based on the log entry data (e.g., end user entity data 55) that was at least originally entered by the end user 32 and that was entered via a social networking website application (e.g., Facebook, Friendster, and so forth).

In the same or different implementations, operation 562 may include an operation 575 for releasing the communiqué to the communication device in response to determining that the one or more third parties are not within the proximate vicinity of the communication device and in response to detecting that the communication device being at one or more particular locations. For instance, the communiqué releasing module 104 including the third party proximity determining module 242 and the communication device location detecting module 232 of the network device 10 of FIG. 1b releasing the communiqué 52 to the communication device 34 in response to the third party proximity determining module 242 determining that the one or more third parties are not within the proximate vicinity of the communication device 34 and in response to the communication device location detecting module 232 detecting that the communication device 34 being at one or more particular locations.

In various implementations, operation 575 may further include an operation 576 for releasing the communiqué to the communication device in response to determining that the one or more third parties are not within the proximate vicinity of the communication device and in response to detecting that the communication device being at the one or more particular locations, the one or more particular locations being specified by the one or more conditional directives. For instance, the communiqué releasing module 104 including the third party proximity determining module 242 and the communication device location detecting module 232 of the network device 10 of FIG. 1b releasing the communiqué 52 to the communication device 34 in response to the third party proximity determining module 242 determining that the one or more third parties are not within the proximate vicinity of the communication device 34 and in response to the communication device location detecting module 232 detecting that the communication device 34 being at the one or more particular locations, the one or more particular locations being specified by the one or more conditional directives 50.

In the same or different implementations, operation 562 may include an operation 577 for releasing the communiqué to the communication device in response to determining that the one or more third parties are not within the proximate vicinity of the communication device and in response to detecting the communication device having reached one or more particular points or intervals of time. For instance, the communiqué releasing module 104 including the third party proximity determining module 242 and the communication device time detecting module 230 of the network device 10 of FIG. 1b releasing the communiqué 52 to the communication device 34 in response to the third party proximity determining module 242 determining that the one or more third parties are not within the proximate vicinity of the communication device 34 and in response to the communication device time detecting module 230 detecting the communication device 34 having reached one or more particular points or intervals of time (e.g., from December 24 to January 2).

Figure 5F:
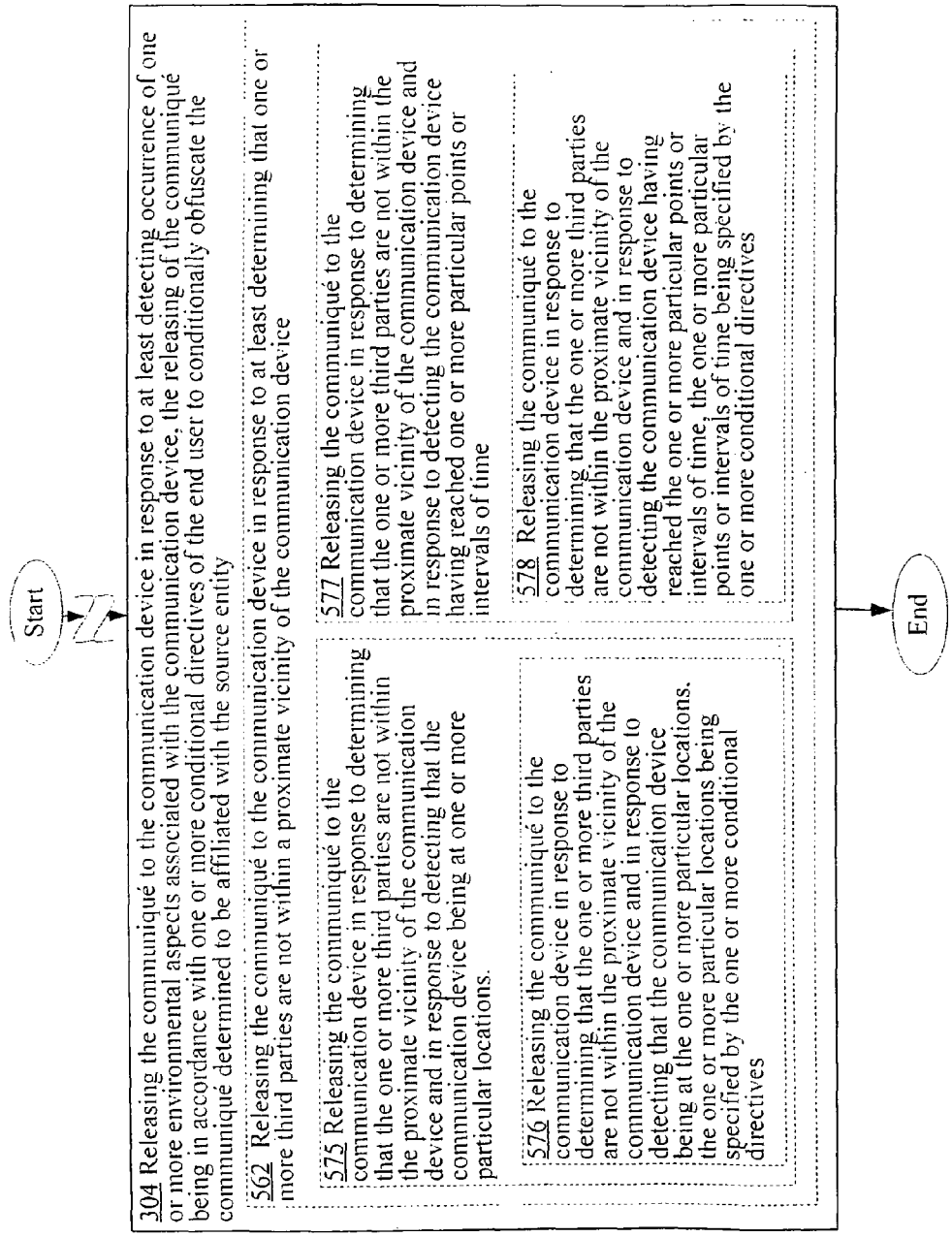
FIG. 5f is a high-level logic flowchart of a process depicting alternate implementations of the communiqué releasing operation 304 of FIG. 3.

As further illustrated in FIG. 5f, operation 577 may further include, in some implementations, an operation 578 for releasing the communiqué to the communication device in response to determining that the one or more third parties are not within the proximate vicinity of the communication device and in response to detecting the communication device having reached the one or more particular points or intervals of time, the one or more particular points or intervals of time being specified by the one or more conditional directives. For instance, the communiqué releasing module 104 including the third party proximity determining module 242 and the communication device time detecting module 230 of the network device 10 of FIG. 1b releasing the communiqué 52 to the communication device 34 in response to the third party proximity determining module 242 determining that the one or more third parties are not within the proximate vicinity of the communication device 34 and in response to the communication device time detecting module 230 detecting the communication device 34 having reached the one or more particular points or intervals of time, the one or more particular points or intervals of time being specified by the one or more conditional directives 50.

Figure 5G:
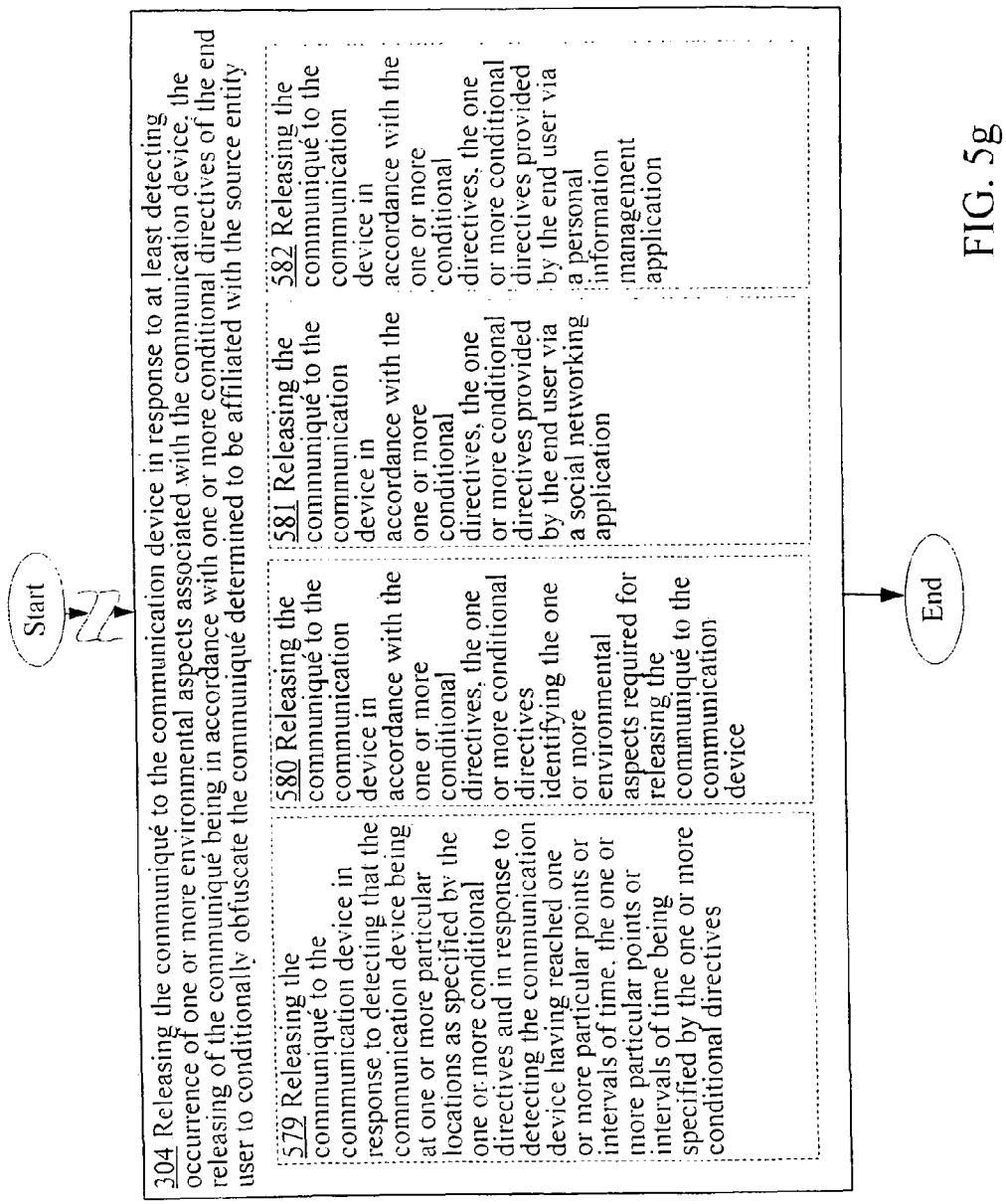
FIG. 5g is a high-level logic flowchart of a process depicting alternate implementations of the communiqué releasing operation 304 of FIG. 3.

In various implementations, and as illustrated in FIG. 5g, the communiqué releasing operation 304 may include an operation 579 for releasing the communiqué to the communication device in response to detecting that the communication device being at one or more particular locations as specified by the one or more conditional directives and in response to detecting the communication device having reached one or more particular points or intervals of time, the one or more particular points or intervals of time being specified by the one or more conditional directives. For instance, the communiqué releasing module 104 including the communication device location detecting module 232 and the communication device time detecting module 230 of the network device 10 of FIG. 1b releasing the communiqué 52 to the communication device 34 in response to the communication device location detecting module 232 detecting that the communication device 34 being at one or more particular locations as specified by the one or more conditional directives 50 and in response to the communication device time detecting module 230 detecting the communication device 34 having reached one or more particular points or intervals of time, the one or more particular points or intervals of time being specified by the one or more conditional directives 50.

In the same or different implementations, the communiqué releasing operation 304 may include an operation 580 for releasing the communiqué to the communication device in accordance with the one or more conditional directives, the one or more conditional directives identifying the one or more environmental aspects required for releasing the communiqué to the communication device. For instance, the communiqué releasing module 104 of the network device 10 of FIG. 1b releasing the communiqué 52 to the communication device 34 in accordance with the one or more conditional directives 50, the one or more conditional directives 50 identifying the one or more environmental aspects required for releasing the communiqué 52 to the communication device 34.

In the same or different implementations, the communiqué releasing operation 304 may include an operation 581 for releasing the communiqué to the communication device in accordance with the one or more conditional directives, the one or more conditional directives provided by the end user via a social networking application. For instance, the communiqué releasing module 104 of the network device 10 of FIG. 1b releasing the communiqué 52 to the communication device 34 in accordance with the one or more conditional directives 50, the one or more conditional directives 50 provided by the end user 32 via a social networking application (e.g., a microblogging application such as an application for Twitter or a social networking website application such as applications for Facebook, Friendster, and so forth).

In the same or different implementations the communiqué releasing operation 304 may include an operation 582 for releasing the communiqué to the communication device in accordance with the one or more conditional directives, the one or more conditional directives provided by the end user via a personal information management application. For instance, the communiqué releasing module 104 of the network device 10 of FIG. 1b releasing the communiqué 52 to the communication device 34 in accordance with the one or more conditional directives 50, the one or more conditional directives 50 provided by the end user 32 via a personal information management application (e.g., Microsoft Outlook).

Figure 6:
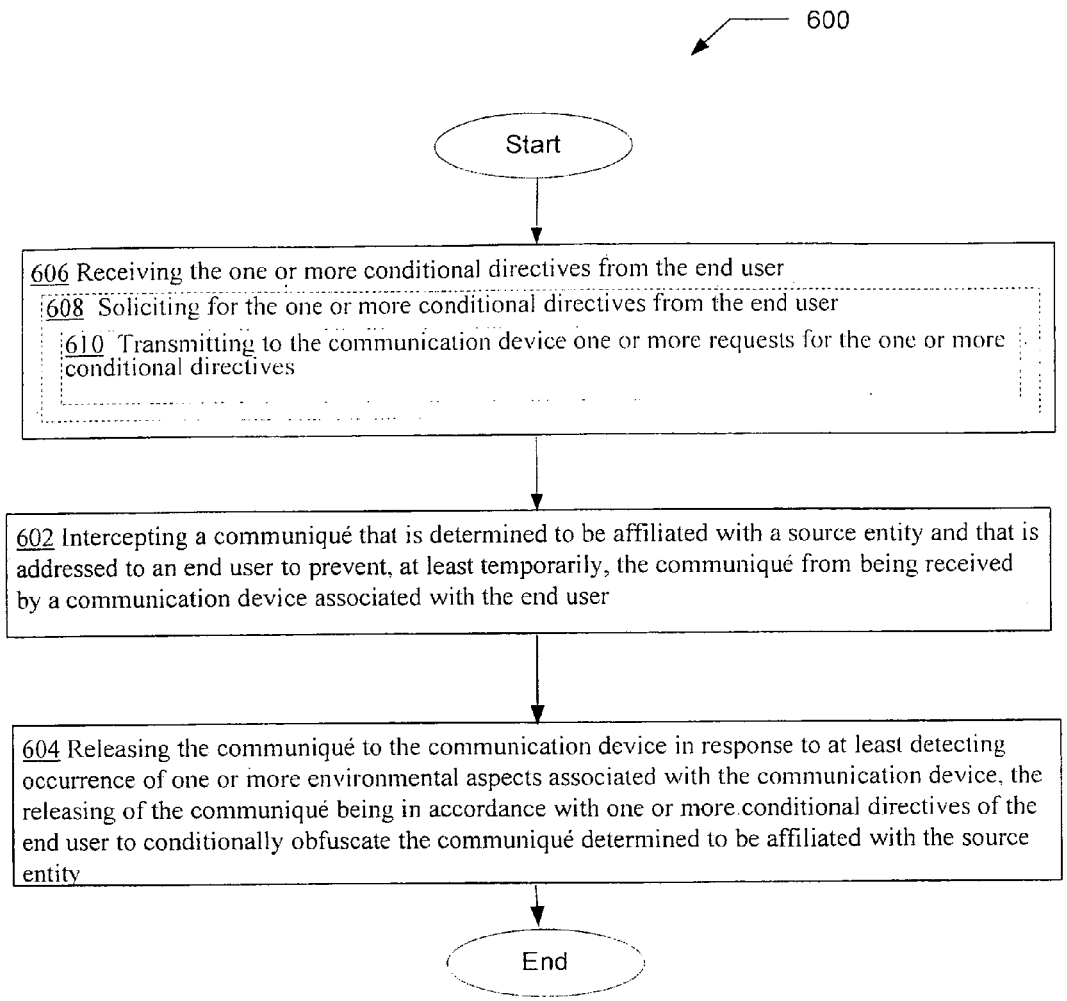
FIG. 6 is another high-level logic flowchart of another process.

Referring to FIG. 6 illustrating another operational flow 600 in accordance with various embodiments. Operational flow 600 includes certain operations that mirror the operations included in operational flow 300 of FIG. 3. These operations include a communiqué intercepting operation 602 and a communiqué releasing operation 604 that corresponds to and mirror the communiqué intercepting operation 302 and the communiqué releasing operation 304, respectively, of FIG. 3.

In addition, operational flow 600 may include a conditional directive receiving operation 606 for receiving the one or more conditional directives from the end user as depicted in FIG. 6. For instance, the conditional directive receiving module 101 of the network device 10 of FIG. 1b receiving the one or more conditional directives 50 from the end user 32.

In some implementations, the conditional directive receiving operation 606 may further include an operation 608 for soliciting for the one or more conditional directives from the end user as further depicted in FIG. 6. For instance, the conditional directive soliciting module 105 of the network device 10 of FIG. 1b soliciting for the one or more conditional directives 50 from the end user entity 30 (e.g., solicit the one or more conditional directives 50 from an end user 32 of the end user entity 30).

Operation 608, in turn, may further include, in various implementations, an operation 610 for transmitting to the communication device one or more requests for the one or more conditional directives as depicted in FIG. 6. For instance, the conditional directive request transmitting module 106 of the network device 10 transmitting (e.g., via one or more communication networks 40) to the communication device 34 one or more requests for the one or more conditional directives 50.

Figure 7:
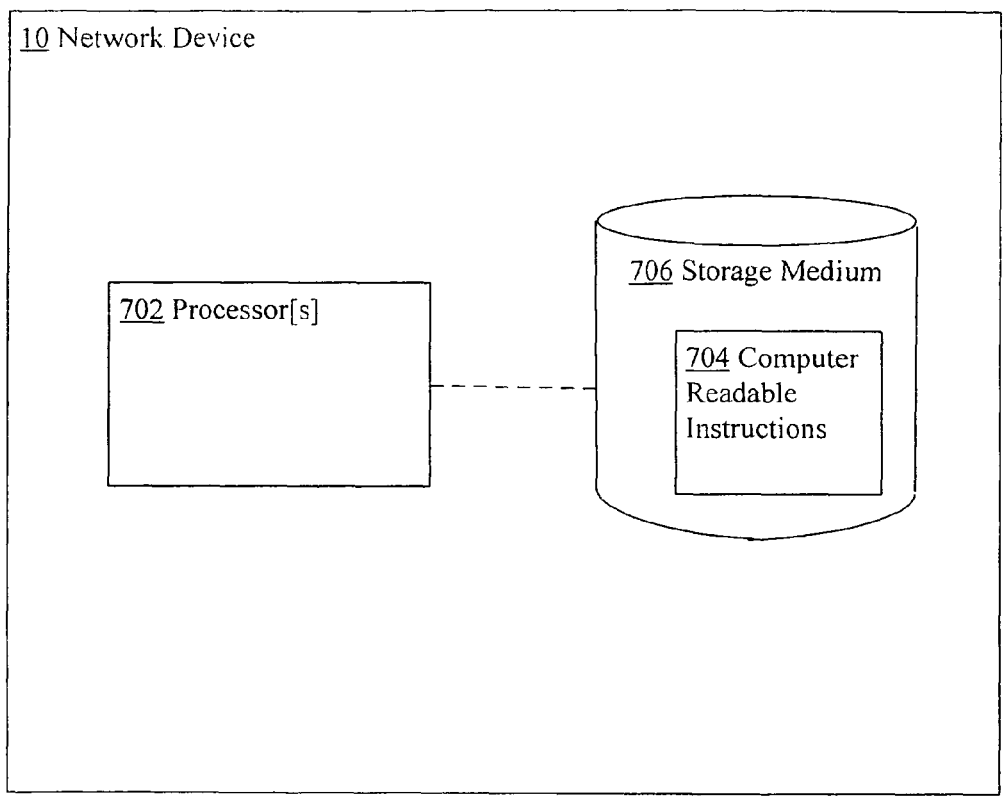
FIG. 7 is another high-level block diagram showing another implementation of the network device 10 of FIG. 1b.

Turning now to FIG. 7, which is a high-level block diagram illustrating a particular implementation of the network device 10 of FIG. 1b. As illustrated, the network device 10, which may comprise of one or more servers in some embodiments, may include one or more processors 702 (e.g., one or more microprocessors, one or more controllers, and so forth) linked to storage medium 706 (e.g., volatile and/or non-volatile memory). The storage medium 706 may store computer readable instructions 704 (e.g., computer program product). The one or more processors 702, in various implementations, may execute the computer readable instructions 704 in order to execute one or more operations described above and as illustrated in, for example, FIGS. 3, 4a, 4b, 4c, 4d, 5a, 5b, 5c, 5d, 5e, 5f, and 5g. From another perspective, FIG. 7 illustrates one implementation of the network device 10 in which the communiqué intercepting module 102, the communiqué releasing module 104, and their sub-modules (e.g., as illustrated in FIGS. 2a, and 2b) of the network device 10 are implemented by the one or more processors 702 executing software (e.g., depicted as computer readable instructions 704 in FIG. 7) that may be stored in a memory (e.g., depicted as storage medium 706 in FIG. 7). Note again that in some embodiments, such as in case of cloud computing, the network device 10 may be implemented using multiple network component devices (e.g., multiple servers) located at multiple network sites (e.g., the storage medium 706 located at a first network site while the one or more processors 702 located at a second network site).

For example, the processor 702 may execute the computer readable instructions 704 in order to intercept a communiqué 52 that is determined to be affiliated with a source entity 20 and that is addressed to an end user 32 to prevent, at least temporarily, the communiqué 52 from being received by a communication device 34 associated with the end user 32; and to release the communiqué 52 to the communication device 34 in response to at least detecting occurrence of one or more environmental aspects associated with the communication device 34, the releasing of the communiqué 52 being in accordance with one or more conditional directives 50 of the end user 32 to conditionally obfuscate the communiqué 52 affiliated with the source entity 20 as illustrated by the operational flow 300 of FIG. 3.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together; and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B.".

What is claimed is:

1. A computationally-implemented system, comprising:
   (a) circuitry for intercepting a communiqué addressed to an end user and that has been determined to be affiliated with a source entity to prevent, at least temporarily until at least one of receipt of or calculation of an indication of one or more occurrences of one or more environmental aspects associated with a communication device associated with the end user, the communiqué from reaching at least one of a display screen or an audio output device of the communication device associated with the end user, the circuitry for intercepting configured to prevent the communiqué that is addressed to the end user from reaching at least one of a display screen or an audio output device of the communication device at least in part by a diversion of the communiqué to one or more memories and by a withholding of the communiqué at least until the at least one of receipt of or calculation of an indication of the one or more occurrences; and
   (b) circuitry for releasing the communiqué to the at least one of a display screen or an audio output device of the communication device in response to the at least one of receipt of or calculation of an indication of one or more occurrences of the one or more environmental aspects associated with the communication device, including at least one of:
      (1) circuitry for releasing the communiqué to the at least one of a display screen or an audio output device of the communication device in response to at least one of receipt of or calculation of an indication of the communication device having reached one or more particular points or intervals of time, including at least:
         (A) circuitry for releasing the communiqué to the at least one of a display screen or an audio output device of the communication device in response to at least one of receipt of or calculation of an indication of the communication device having reached one or more specified points or intervals of time as specified by one or more conditional directives of the end user to conditionally obfuscate the communiqué determined to be affiliated with the source entity; or
      (2) circuitry for releasing the communiqué to the at least one of a display screen or an audio output device of the communication device in response to at least one of receipt of or calculation of an indication that one or more third parties are not within a proximate vicinity of the at least one of a display screen or an audio output device of the communication device, including at least:
         (A) circuitry for releasing the communiqué to the at least one of a display screen or an audio output device of the communication device in response to at least one of receipt of or calculation of an indication that one or more third parties are not within a proximate vicinity of the at least one of a display screen or an audio output device of the communication device, the one or more third parties being one or more specified parties specified by one or more conditional directives of the end user to conditionally obfuscate the communiqué determined to be affiliated with the source entity; and wherein at least one of the circuitry for intercepting or the circuitry for releasing the communiqué to the at least one of a display screen or an audio output device of the communication device in response to the at least one of receipt of or calculation of an indication of one or more occurrences of the one or more environmental aspects associated with the communication device is at least partly implemented with hardware.

2. The computationally-implemented system of claim 1, wherein said circuitry for intercepting a communiqué addressed to an end user and that has been determined to be affiliated with a source entity to prevent, at least temporarily until at least one of receipt of or calculation of an indication of detection of one or more occurrences of one or more environmental aspects associated with a communication device associated with the end user, the communiqué from reaching at least one of a display screen or an audio output device of the communication device associated with the end user, the circuitry for intercepting configured to prevent the communiqué that is addressed to the end user from reaching at least one of a display screen or an audio output device of the communication device at least in part by a diversion of the communiqué to one or more memories and by a withholding of the communiqué at least until the at least one of receipt of or calculation of an indication of the one or more occurrences comprises:
   circuitry for selectively intercepting the communiqué that is addressed to the end user and that is determined to be affiliated with the source entity while allowing one or more other communiqués that are addressed to the end user but are determined not to be affiliated with the source entity to reach the at least one of a display screen or an audio output device of the communication device.

3. The computationally-implemented system of claim 2, wherein said circuitry for selectively intercepting the communiqué that is addressed to the end user and that is determined to be affiliated with the source entity while allowing one or more other communiqués that are addressed to the end user but are determined not to be affiliated with the source entity to reach the at least one of a display screen or an audio output device of the communication device, comprises:
   circuitry for selectively intercepting the communiqué that is addressed to the end user and that is determined to be affiliated with the source entity in accordance with one or more conditional directives of the end user to conditionally obfuscate the communiqué determined to be affiliated with the source entity.

4. The computationally-implemented system of claim 1, wherein said circuitry for intercepting a communiqué addressed to an end user and that has been determined to be affiliated with a source entity to prevent, at least temporarily until at least one of receipt of or calculation of an indication of one or more occurrences of one or more environmental aspects associated with a communication device associated with the end user, the communiqué from reaching at least one of a display screen or an audio output device of the communication device associated with the end user, the circuitry for intercepting configured to prevent the communiqué that is addressed to the end user from reaching at least one of a display screen or an audio output device of the communication device at least in part by a diversion of the communiqué to one or more memories and by a withholding of the communiqué at least until the at least one of receipt of or calculation of an indication of the one or more occurrences comprises:

circuitry for determining that the communiqué includes at least header data that indicates the affiliation between the communiqué and the source entity.

5. The computationally-implemented system of claim 4, wherein said circuitry for determining that the communiqué includes at least header data that indicates the affiliation between the communiqué and the source entity comprises:
    circuitry for ascertaining that the communiqué includes at least header data that identifies the source entity as a source for the communiqué.

6. The computationally-implemented system of claim 4, wherein said circuitry for determining that the communiqué includes at least header data that indicates the affiliation between the communiqué and the source entity comprises:
    circuitry for ascertaining that the communiqué includes at least header data that indicates a subject heading for the communiqué that affiliates the communiqué with the source entity.

7. The computationally-implemented system of claim 6, wherein said circuitry for ascertaining that the communiqué includes at least header data that indicates a subject heading for the communiqué that affiliates the communiqué with the source entity comprises:
    circuitry for ascertaining that the communiqué includes at least header data that indicates a subject heading that includes at least one or more phrases identified by one or more conditional directives of the end user as being associated with the source entity, the one or more conditional directives being directives to conditionally obfuscate the communiqué determined to be affiliated with the source entity.

8. The computationally-implemented system of claim 1, wherein said circuitry for intercepting a communiqué addressed to an end user and that has been determined to be affiliated with a source entity to prevent, at least temporarily until at least one of receipt of or calculation of an indication of one or more occurrences of one or more environmental aspects associated with a communication device associated with the end user, the communiqué from reaching at least one of a display screen or an audio output device of the communication device associated with the end user, the circuitry for intercepting configured to prevent the communiqué that is addressed to the end user from reaching at least one of a display screen or an audio output device of the communication device at least in part by a diversion of the communiqué to one or more memories and by a withholding of the communiqué at least until the at least one of receipt of or calculation of an indication of the one or more occurrences comprises:
    circuitry for determining that the communiqué includes at least message content data that indicates the affiliation between the communiqué and the source entity.

9. The computationally-implemented system of claim 8, wherein said circuitry for determining that the communiqué includes at least message content data that indicates the affiliation between the communiqué and the source entity comprises:
    circuitry for ascertaining that the communiqué includes at least message content data that indicates one or more items associated with the source entity.

10. The computationally-implemented system of claim 8, wherein said circuitry for determining that the communiqué includes at least message content data that indicates the affiliation between the communiqué and the source entity comprises:
    circuitry for ascertaining that the communiqué includes at least message content data that includes at least image data for at least one image associated with the source entity.

11. The computationally-implemented system of claim 8, wherein said circuitry for determining that the communiqué includes at least message content data that indicates the affiliation between the communiqué and the source entity comprises:
    circuitry for ascertaining that the communiqué includes at least message content data that includes at least audio data for at least one voice having a voice signature associated with the source entity.

12. The computationally-implemented system of claim 1, wherein said circuitry for releasing the communiqué to the at least one of a display screen or an audio output device of the communication device in response to the at least one of receipt of or calculation of an indication of the one or more occurrences of the one or more environmental aspects associated with the communication device comprises:
    circuitry for determining whether end user entity data that indicates the one or more occurrences of the one or more environmental aspects associated with the communication device has been received.

13. The computationally-implemented system of claim 12, wherein said circuitry for determining whether end user entity data that indicates the one or more occurrences of the one or more environmental aspects associated with the communication device has been received comprises:
    circuitry for determining whether sensor data that was at least originally provided by one or more sensors and that indicates the one or more occurrences of the one or more environmental aspects associated with the communication device has been received.

14. The computationally-implemented system of claim 13, wherein said circuitry for determining whether sensor data that was at least originally provided by one or more sensors and that indicates the one or more occurrences of the one or more environmental aspects associated with the communication device has been received, comprises:
    circuitry for determining whether image data that indicates the one or more occurrences of the one or more environmental aspects associated with the communication device has been received.

15. The computationally-implemented system of claim 13, wherein said circuitry for determining whether sensor data that was at least originally provided by one or more sensors and that indicates the one or more occurrences of the one or more environmental aspects associated with the communication device has been received comprises:
    circuitry for determining whether audio data that indicates the one or more occurrences of the one or more environmental aspects associated with the communication device has been received.

16. The computationally-implemented system of claim 13, wherein said circuitry for determining whether sensor data that was at least originally provided by one or more sensors and that indicates the one or more occurrences of the one or more environmental aspects associated with the communication device has been received comprises:
    circuitry for determining whether locational data that indicates the one or more occurrences of the one or more environmental aspects associated with the communication device has been received.

17. The computationally-implemented system of claim 13, wherein said circuitry for determining whether sensor data that was at least originally provided by one or more sensors and that indicates the one or more occurrences of the one or more environmental aspects associated with the communication device has been received comprises:
  circuitry for determining whether biometric sensor data that indicates the one or more occurrences of the one or more environmental aspects associated with the communication device has been received.

18. The computationally-implemented system of claim 12, wherein said circuitry for determining whether end user entity data that indicates the one or more occurrences of the one or more environmental aspects associated with the communication device has been received comprises:
  circuitry for determining whether end user log data that indicates the one or more occurrences of the one or more environmental aspects associated with the communication device has been received.

19. The computationally-implemented system of claim 18, wherein said circuitry for determining whether end user log data that indicates the one or more occurrences of the one or more environmental aspects associated with the communication device has been received comprises:
  circuitry for determining whether end user log data that was at least originally entered through the communication device and that indicates the one or more occurrences of the one or more environmental aspects associated with the communication device has been received.

20. The computationally-implemented system of claim 12, wherein said circuitry for determining whether end user entity data that indicates the one or more occurrences of the one or more environmental aspects associated with the communication device has been received comprises:
  circuitry for determining whether end user entity data that was at least originally entered through a personal information management application and that indicates the one or more occurrences of the one or more environmental aspects associated with the communication device has been received.

21. The computationally-implemented system of claim 12, wherein said circuitry for determining whether end user entity data that indicates the one or more occurrences of the one or more environmental aspects associated with the communication device has been received comprises:
  circuitry for determining whether end user entity data that was at least originally entered through a social networking application and that indicates the one or more occurrences of the one or more environmental aspects associated with the communication device has been received.

22. The computationally-implemented system of claim 21, wherein said circuitry for determining whether end user entity data that was at least originally entered through a social networking application and that indicates the one or more occurrences of the one or more environmental aspects associated with the communication device has been received comprises:
  circuitry for determining whether end user entity data that was at least originally entered through a microblogging application or a social networking website application and that indicates the one or more occurrences of the one or more environmental aspects associated with the communication device has been received.

23. The computationally-implemented system of claim 1, wherein said circuitry for releasing the communiqué to the at least one of a display screen or an audio output device of the communication device in response to the at least one of receipt of or calculation of an indication of one or more occurrences of the one or more environmental aspects associated with the communication device comprises:
  circuitry for releasing the communiqué to the at least one of a display screen or an audio output device of the communication device in response to the at least one of receipt of or calculation of an indication of communication device being at one or more particular locations, the one or more particular locations having been specified in one or more conditional directives of the end user.

24. The computationally-implemented system of claim 23, wherein said circuitry for releasing the communiqué to the at least one of a display screen or an audio output device of the communication device in response to the at least one of receipt of or calculation of an indication of communication device being at one or more particular locations, the one or more particular locations having been specified in one or more conditional directives of the end user, comprises:
  circuitry for releasing the communiqué to the at least one of a display screen or an audio output device of the communication device in response to the at least one of receipt of or calculation of an indication of communication device being at one or more specified locations as specified by one or more conditional directives of the end user to conditionally obfuscate the communiqué determined to be affiliated with the source entity.

25. The computationally-implemented system of claim 23, wherein said circuitry for releasing the communiqué to the at least one of a display screen or an audio output device of the communication device in response to the at least one of receipt of or calculation of an indication of communication device being at one or more particular locations, the one or more particular locations having been specified in one or more conditional directives of the end user, comprises:
  circuitry for releasing the communiqué to the at least one of a display screen or an audio output device of the communication device in response to the at least one of receipt of or calculation of an indication of communication device being outside of one or more specified locations as specified by one or more conditional directives of the end user to conditionally obfuscate the communiqué determined to be affiliated with the source entity.

26. The computationally-implemented system of claim 1, wherein said circuitry for releasing the communiqué to the at least one of a display screen or an audio output device of the communication device in response to at least one of receipt of or calculation of an indication that one or more third parties are not within a proximate vicinity of the communication device comprises:
  circuitry for releasing the communiqué to the at least one of a display screen or an audio output device of the communication device in response to at least one of receipt of or calculation of an indication that the one or more third parties are not within a maximum distance from the at least one of a display screen or an audio output device of communication device from which the one or more third parties can at least one of hear, see, or sense communiqués that are presented through the at least one of a display screen or an audio output device of communication device.

27. The computationally-implemented system of claim 26, wherein said circuitry for releasing the communiqué to the at least one of a display screen or an audio output device of the communication device in response to at least one of receipt of or calculation of an indication that the one or more third parties are not within a maximum distance from the at least one of a display screen or an audio output device of communication device from which the one or more third parties can at least one of hear, see, or sense communiqués that are presented through the at least one of a display screen or an audio output device of communication device comprises:

circuitry for releasing the communiqué to the at least one of a display screen or an audio output device of the communication device in response to at least one of receipt of or calculation of an indication that the one or more third parties are not within five feet from the at least one of a display screen or an audio output device of communication device.

28. The computationally-implemented system of claim 26, wherein said circuitry for releasing the communiqué to the at least one of a display screen or an audio output device of the communication device in response to at least one of receipt of or calculation of an indication that the one or more third parties are not within a maximum distance from the at least one of a display screen or an audio output device of communication device from which the one or more third parties can at least one of hear, see, or sense communiqués that are presented through the at least one of a display screen or an audio output device of communication device comprises:

circuitry for releasing the communiqué to the at least one of a display screen or an audio output device of the communication device in response to at least one of receipt of or calculation of an indication that the one or more third parties are not within ten feet from the at least one of a display screen or an audio output device of communication device.

29. The computationally-implemented system of claim 1, wherein said circuitry for releasing the communiqué to the at least one of a display screen or an audio output device of the communication device in response to at least one of receipt of or calculation of an indication that one or more third parties are not within a proximate vicinity of the at least one of a display screen or an audio output device of the communication device comprises:

circuitry for at least one of receipt of or calculation of an indication that the one or more third parties are not within a proximate vicinity of the at least one of a display screen or an audio output device of the communication device based on sensor data.

30. The computationally-implemented system of claim 29, wherein said circuitry for at least one of receipt of or calculation of an indication that the one or more third parties are not within a proximate vicinity of the at least one of a display screen or an audio output device of the communication device based on sensor data comprises:

circuitry for at least one of receipt of or calculation of an indication that the one or more third parties are not within the proximate vicinity of the at least one of a display screen or an audio output device of the communication device based on sensor data provided by the communication device.

31. The computationally-implemented system of claim 29, wherein said circuitry for at least one of receipt of or calculation of an indication that the one or more third parties are not within a proximate vicinity of the at least one of a display screen or an audio output device of the communication device based on sensor data comprises:

circuitry for at least one of receipt of or calculation of an indication that the one or more third parties are not within the proximate vicinity of the at least one of a display screen or an audio output device of the communication device based on image data that provides indication of the one or more third parties not being within the proximate vicinity of the at least one of a display screen or an audio output device of the communication device.

32. The computationally-implemented system of claim 29, wherein said circuitry for at least one of receipt of or calculation of an indication that the one or more third parties are not within a proximate vicinity of the at least one of a display screen or an audio output device of the communication device based on sensor data comprises:

circuitry for at least one of receipt of or calculation of an indication that the one or more third parties are not within the proximate vicinity of the at least one of a display screen or an audio output device of the communication device based on audio data that provides indication of the one or more third parties not being within the proximate vicinity of the at least one of a display screen or an audio output device of the communication device.

33. The computationally-implemented system of claim 1, wherein said circuitry for releasing the communiqué to the at least one of a display screen or an audio output device of the communication device in response to at least one of receipt of or calculation of an indication that one or more third parties are not within a proximate vicinity of the at least one of a display screen or an audio output device of the communication device comprises:

circuitry for releasing the communiqué to the at least one of a display screen or an audio output device of the communication device in response at least to one of receipt of or calculation of an indication that the one or more third parties are not detectably present in the proximate vicinity of the at least one of a display screen or an audio output device of the communication device.

34. The computationally-implemented system of claim 1, wherein said circuitry for releasing the communiqué to the at least one of a display screen or an audio output device of the communication device in response to at least one of receipt of or calculation of an indication that one or more third parties are not within a proximate vicinity of the at least one of a display screen or an audio output device of the communication device comprises:

circuitry for at least one of receipt of or calculation of an indication that the one or more third parties are not within the proximate vicinity of the at least one of a display screen or an audio output device of the communication device based on log entry data that was at least originally entered by the end user.

35. The computationally-implemented system of claim 34, wherein said circuitry for at least one of receipt of or calculation of an indication that the one or more third parties are not within the proximate vicinity of the at least one of a display screen or an audio output device of the communication device based on log entry data that was at least originally entered by the end user comprises:

circuitry for at least one of receipt of or calculation of an indication that the one or more third parties are not within the proximate vicinity of the at least one of a display screen or an audio output device of the communication device based on the log entry data that was at least originally entered by the end user and that was entered via a personal information management application.

36. The computationally-implemented system of claim 34, wherein said circuitry for at least one of receipt of or calculation of an indication that the one or more third parties are not within the proximate vicinity of the at least one of a display screen or an audio output device of the communication device based on log entry data that was at least originally entered by the end user comprises:

circuitry for at least one of receipt of or calculation of an indication that the one or more third parties are not within the proximate vicinity of the at least one of a display screen or an audio output device of the communication device based on the log entry data that was at least originally entered by the end user and that was entered via a social networking website application.

37. The computationally-implemented system of claim 1, wherein said circuitry for releasing the communiqué to the at least one of a display screen or an audio output device of the communication device in response to at least one of receipt of or calculation of an indication that one or more third parties are not within a proximate vicinity of the at least one of a display screen or an audio output device of the communication device comprises:
  circuitry for releasing the communiqué to the at least one of a display screen or an audio output device of the communication device in response to at least one of receipt of or calculation of an indication that the one or more third parties are not within the proximate vicinity of the at least one of a display screen or an audio output device of the communication device and in response to at least one of receipt of or calculation of an indication that the communication device being at one or more particular locations.

38. The computationally-implemented system of claim 1, wherein said circuitry for releasing the communiqué to the at least one of a display screen or an audio output device of the communication device in response to at least one of receipt of or calculation of an indication that one or more third parties are not within a proximate vicinity of the at least one of a display screen or an audio output device of the communication device comprises:
  circuitry for releasing the communiqué to the at least one of a display screen or an audio output device of the communication device in response to at least one of receipt of or calculation of an indication that the one or more third parties are not within the proximate vicinity of the at least one of a display screen or an audio output device of the communication device and in response to at least one of receipt of or calculation of an indication the communication device having reached one or more particular points or intervals of time.

39. The computationally-implemented system of claim 1, further comprising:
  circuitry for receiving one or more conditional directives of the end user to conditionally obfuscate the communiqué determined to be affiliated with the source entity from the end user.

40. The computationally-implemented system of claim 39, wherein said circuitry for receiving one or more conditional directives of the end user to conditionally obfuscate the communiqué determined to be affiliated with the source entity from the end user comprises:
  circuitry for soliciting for the one or more conditional directives from the end user.

41. The computationally-implemented system of claim 1, further comprising:
  one or more network devices configured to transmit one or more communiqué's at least partway between the source entity and the communication device associated with the end user, the one or more network devices including at least a portion of the circuitry for intercepting a communiqué and the one or more network devices being separate from and not a part of the communication device associated with the end user.

42. The computationally-implemented system of claim 41, further comprising:
  circuitry for receiving one or more conditional directives of the end user to intercept the communiqué based, at least in part, on a determination that the communiqué is affiliated with a particular source entity and addressed to the end user; and
  wherein the one or more network devices, that that are separate from and not a part of the communication device associated with the end user, include at least a portion of the circuitry for receiving one or more directives of the end user.

43. The computationally-implemented system of claim 1, wherein the circuitry for intercepting a communiqué addressed to an end user and that has been determined to be affiliated with a source entity to prevent, at least temporarily until at least one of receipt of or calculation of an indication of one or more occurrences of one or more environmental aspects associated with a communication device associated with the end user, the communiqué from reaching at least one of a display screen or an audio output device of the communication device associated with the end user, the circuitry for intercepting configured to prevent the communiqué that is addressed to the end user from reaching at least one of a display screen or an audio output device of the communication device at least in part by a diversion of the communiqué to one or more memories and by a withholding of the communiqué at least until at least one of receipt of or calculation of an indication of the one or more occurrences comprises:
  circuitry for intercepting configured to prevent the communiqué that is addressed to the end user from reaching at least one of a display screen or an audio output device of the communication device, wherein the circuitry for intercepting is at least a part of the communication device.

44. The computationally-implemented system of claim 1, wherein the circuitry for intercepting a communiqué addressed to an end user and that has been determined to be affiliated with a source entity to prevent, at least temporarily until at least one of receipt of or calculation of an indication of one or more occurrences of one or more environmental aspects associated with a communication device associated with the end user, the communiqué from reaching at least one of a display screen or an audio output device of the communication device associated with the end user, the circuitry for intercepting configured to prevent the communiqué that is addressed to the end user from reaching at least one of a display screen or an audio output device of the communication device at least in part by a diversion of the communiqué to one or more memories and by a withholding of the communiqué at least until at least one of receipt of or calculation of an indication of the one or more occurrences comprises:
  circuitry for intercepting configured to prevent the communiqué that is addressed to the end user from reaching any portion of the communication device, wherein the circuitry for intercepting is at least a part of a network device that is separate from the communication device.

45. A system, comprising:
  (a) a communiqué intercepting module including at least a source entity affiliated determining module configured to intercept a communiqué addressed to an end user and that has been determined by the source entity affiliated determining module to be affiliated with a source entity to prevent the communiqué from reaching at least one of a display screen or an audio output device of a communication device associated with the end user at least temporarily until at least one of receipt of or calculation of an indication of one or more occurrences of one or more environmental aspects associated with the communication device associated with the end user, the communiqué intercepting module configured to prevent the communiqué that is addressed to the end user from reaching at least one of a display screen or an audio output device of the communication device at least in part by a diversion of the communiqué to one or more memories and by a withholding of the communiqué at least until the at least one of receipt of or calculation of an indication of the one or more occurrences; and (b) a communiqué releasing module including at least an environmental aspect occurrence module configured to release the communiqué to the at least one of a display screen or an audio output device of the communication device in response to the environmental aspect occurrence module at least one of receiving or calculating an indication of one or more occurrences of the one or more environmental aspects associated with the communication device, including at least one of:

(1) a first module portion configured for releasing the communiqué to the at least one of a display screen or an audio output device of the communication device in response to at least one of receipt of or calculation of an indication of the communication device having reached one or more particular points or intervals of time, including at least:

(A) a first module sub-portion configured for releasing the communiqué to the at least one of a display screen or an audio output device of the communication device in response to at least one of receipt of or calculation of an indication of the communication device having reached one or more specified points or intervals of time as specified by one or more conditional directives of the end user to conditionally obfuscate the communiqué determined to be affiliated with the source entity; or (2) a second module portion configured for releasing the communiqué to the at least one of a display screen or an audio output device of the communication device in response to at least one of receipt of or calculation of an indication that one or more third parties are not within a proximate vicinity of the at least one of a display screen or an audio output device of the communication device, including at least:

(A) a second module sub-portion configured for releasing the communiqué to the at least one of a display screen or an audio output device of the communication device in response to at least one of receipt of or calculation of an indication that one or more third parties are not within a proximate vicinity of the at least one of a display screen or an audio output device of the communication device, the one or more third parties being one or more specified parties specified by one or more conditional directives of the end user to conditionally obfuscate the communiqué determined to be affiliated with the source entity; and wherein at least one of the communiqué intercepting module or the communiqué releasing module is at least partly implemented with hardware.

* * * * *

UNITED STATES PATENT AND TRADEMARK OFFICE
CERTIFICATE OF CORRECTION

PATENT NO.        : 8,929,208 B2                              Page 1 of 1
APPLICATION NO.   : 12/925014
DATED             : January 6, 2015
INVENTOR(S)       : Cohen et al.

It is certified that error appears in the above-identified patent and that said Letters Patent is hereby corrected as shown below:

In the Claims:

In Column 40, Lines 14-15, Claim 2: please delete
"… an indication of detection of one or more occurrences of one or more …" and replace with
--… an indication of one or more occurrences of one or more …--

In Column 42, Line 18, Claim 12: please delete
"receipt of or calculation of an indication of the one or more" and replace with
--receipt of or calculation of an indication of one or more--

Signed and Sealed this
Tenth Day of November, 2015

Michelle K. Lee
*Director of the United States Patent and Trademark Office*